(12) United States Patent
Shahar et al.

(10) Patent No.: US 10,156,646 B1
(45) Date of Patent: Dec. 18, 2018

(54) SYSTEMS AND METHODS FOR A RADIATION DETECTOR

(71) Applicant: General Electric Company, Schenectady, NY (US)

(72) Inventors: Arie Shahar, Moshav Magshimim (IL); Moshe Cohen-Erner, Even—Yehuda (IL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/621,501

(22) Filed: Jun. 13, 2017

(51) Int. Cl.
*G01T 1/36* (2006.01)

(52) U.S. Cl.
CPC ..................... *G01T 1/36* (2013.01)

(58) Field of Classification Search
CPC ......................................................... G01T 1/36
See application file for complete search history.

(56) References Cited

U.S. PATENT DOCUMENTS

| 9,482,764 B1 | 11/2016 | Shahar et al. |
| 9,632,186 B2 | 4/2017 | Shahar et al. |
| 2002/0079456 A1* | 6/2002 | Lingren ............ H01L 27/14659 250/370.01 |
| 2014/0185781 A1* | 7/2014 | Reitz ........................ G01T 1/247 378/207 |
| 2016/0245934 A1 | 8/2016 | Shahar et al. |

* cited by examiner

*Primary Examiner* — Hugh H Maupin
(74) *Attorney, Agent, or Firm* — Dean D. Small; The Small Patent Law Group, LLC

(57) ABSTRACT

The systems and methods described herein measure a collected energy signal from a first pixel of a radiation pixelated detector during at least one event, and measure adjacent energy signals from at least two pixels adjacent to the first pixel of the radiation pixelated detector during the at least one event. The systems and methods generate a first spectrum based on the collected energy signal of the at least one event within an energy window. The energy window is a predetermined energy range for medical imaging. The systems and methods determine a delta charge based on the collected energy signal and the adjacent energy signals generated during the at least one event, generate a second spectrum based on the delta charge of the at least one event outside the energy window, and stretch the second spectrum to combine with the first spectrum to form a corrected energy spectrum.

20 Claims, 14 Drawing Sheets

SYSTEMS AND METHODS FOR A RADIATION DETECTOR

BACKGROUND OF THE INVENTION

The subject matter disclosed herein relates generally to imaging systems, and more particularly to methods and systems for reducing low-energy tails of a radiation detector.

Conventional radiation detectors receive one or more photons during an imaging session. The absorption of a photon represent an event that is collected by the radiation detector. When the radiation detector absorbs the photon a negative charge cloud of electrons and a positive charge cloud of holes are created. The negative charge cloud of electrons drifts toward the positively charged anode of the conventional radiation detector. The positive charge cloud of holes drifts toward the negatively charged cathodes of the radiation detector. The positive charge cloud moves slower relative to the negative charge cloud.

For any single event, the photon may be absorbed at various depths within the radiation detector. The depth is between the cathode or anode and a location where the photon, which is absorbed and referred to as a depth of interaction (DOI). A charge induced by the positive charge cloud on the cathode is negligible in some semiconductors, such as CdZnTe (CZT), which have low value of the product $\mu\tau$ for holes. The variable $\mu$ represents mobility, and the variable $\tau$ is the electron lifetime. The charge on the anode is proportional to the depth of a location of the event where the photon is absorbed.

The charge is associated with events, and are collected and recorded as corresponding energy values. During an imaging session of the radiation detector, multiple events are tracked and the corresponding energy values are recorded. The energy values for the events are analyzed to form one or more energy spectrums. The energy spectrums represent a count of a number of events at corresponding energy values of a select range (e.g., a histogram). The energy spectrum may be divided into a primary energy range and a low energy tail. The primary energy range is positioned to include a peak in the energy spectrum, while the low energy tail includes energy levels below the peak. The low energy tail reduces the efficiency of the radiation detector.

To reduce the low energy tail, conventional methods utilize: i) small anodes combined with a steering grid for creating a small pixel effect; ii) a co-planar grid including two interleaved grids that are biased by two different potentials to create a collecting and non-collecting grids (e.g., Luke grid); or iii) a small pixel effect combined with a signal derived from the cathode to calculate the DOI for applying electronic corrections. However, the conventional method of using the small anodes combined with the steering grid requires the use of many electronic channels. Conventionally, one electronic channel is coupled to each anode of the radiation detector. Accordingly, the use of small anodes requires the use of many anodes and electronic channels, which is a technical challenge. Additionally, the anodes require high voltage bias that is different from the high voltage bias applied to the steering grid, and the steering grid complicates the integration of the detector components due to interconnections and packaging.

Additionally, the conventional method of using the co-planar grid (e.g., the Luke grid) includes two high density grids interleaved together. The high density of the grids are necessary to create a similar response regardless of a location of the event. Accordingly, the conventional method is not useful for imaging purposes as it does not provide information on the event location. Further, the co-planar grid utilizes a permanent analog subtraction between the signals of the collecting and non-collecting grids for all of the events. The permanent analog subtraction decreases the signal-to-noise ratio for all of the events including events that do not need to be corrected by the co-planar grid. Additionally, the co-planar grid cannot be implemented with pixelated anodes as the co-planar grid requires a permanent analog differential subtraction between the pairs of pixels.

BRIEF DESCRIPTION OF THE INVENTION

In accordance with an embodiment, a method (e.g., for reducing a low energy tail in an energy spectrum) is provided. The method includes measuring a collected energy signal from a first pixel of a radiation pixelated detector during at least one event, and measuring adjacent energy signals from at least two pixels adjacent to the first pixel of the radiation pixelated detector during the at least one event. The method includes generating a first spectrum based on the collected energy signal of the at least one event within an energy window. The energy window being a predetermined energy range for medical imaging. The method includes determining a delta charge based on the collected energy signal and the adjacent energy signals generated during the at least one event, In accordance with an embodiment, a system (e.g., a medical imaging system) is provided. The system includes a radiation pixelated detector having a plurality of pixelated anodes operably coupled to corresponding electronic channels. The system includes a controller circuit. The controller circuit is operably coupled to the electronic channels. The controller circuit is configured to measure a collected energy signal from a first pixel of the radiation pixelated detector during at least one event, and measure an adjacent energy signals from at least two second pixels adjacent to the first pixel of the radiation pixelated detector during the at least one event. The controller circuit is configured to generate a first spectrum based on a portion of the collected energy signal of the at least one event within an energy window. The energy window being a predetermined energy range for medical imaging. The controller circuit is configured to determine a delta charge based on the collected energy signal and the adjacent energy signals generated during the at least one event, generate a second spectrum based on the delta charge of the at least one event outside the event window, and stretching the second spectrum to combine with the first spectrum to form a corrected energy spectrum based on the delta charge.

In accordance with an embodiment, a method (e.g., for reducing a low energy tail in an energy spectrum) is provided. The method includes measuring a collected energy signal from a first pixel of a radiation pixelated detector during at least one event, measuring adjacent energy signals from at least two pixels adjacent to the first pixel of the radiation pixelated detector during at least one event, and determining a corrected energy signal based on the collected energy signal and the adjacent energy signals based on an adjusting factor. The method includes determining a delta charge based on the collected energy signal and the adjacent energy signals, generating a spectrum based on the delta charge of the at least one event, and stretching the spectrum to form a corrected energy spectrum based on the delta charge.

DETAILED DESCRIPTION OF THE INVENTION

Figure 1:
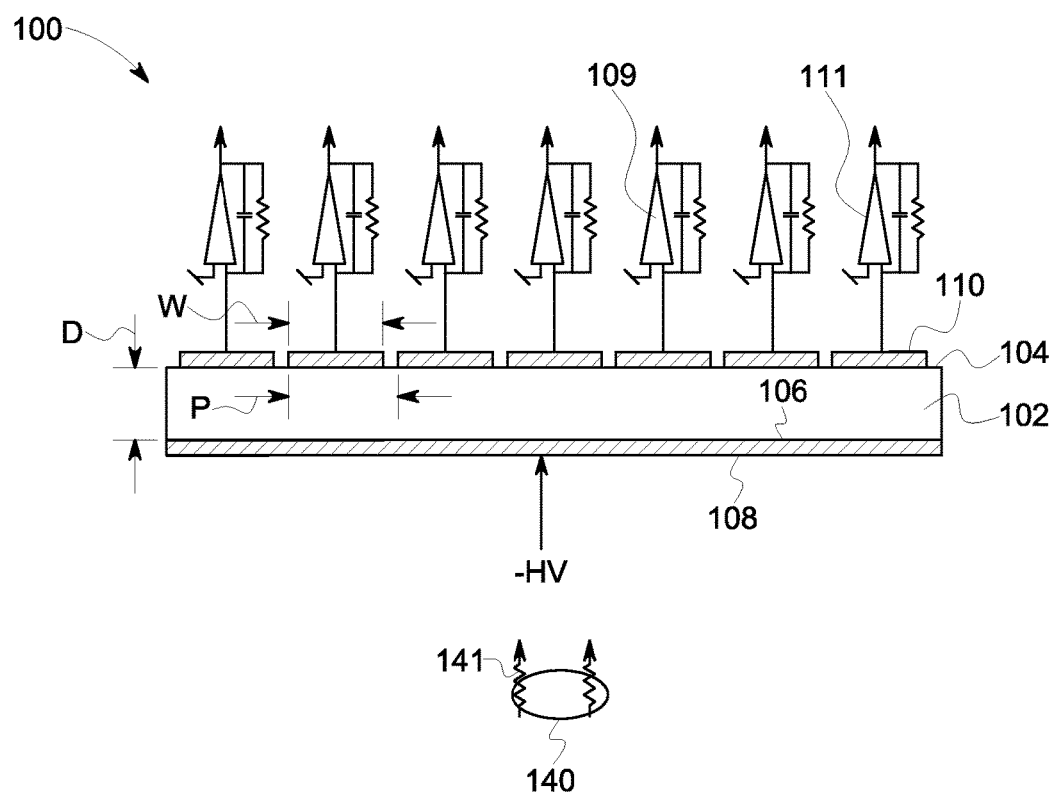
FIG. 1 is a side view of an embodiment of a portion of a radiation pixelated detector.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Generally, various embodiments provided herein describe radiation pixelated detectors for ionizing radiation, such as X-Ray and Gamma-Rays, and more specifically for radiation detectors of a medical imaging system such as a nuclear imaging system, a gamma camera, Single Photon Emission Computed Tomography (SPECT), Molecular Brest Imaging (MBI), Positron Emission Tomography (PET), and/or the like. The medical imaging systems described herein are configured to be insensitive to the DOI. The medical imaging system reduces the low energy tail of the radiation pixelated detector of a spectrum of collected energy signals during at least one event.

A technical effect provided by at least one embodiment includes providing a pixelated radiation detector that is insensitive to the DOI and is able to provide location information for an event. A technical effect provided by at least one embodiment includes providing a pixelated radiation detector that is insensitive to the DOI and has pixelated anodes that are biased to a common potential. A technical effect provided by at least one embodiment includes providing a pixelated radiation detector that is insensitive to the DOI. A technical effect provided by at least one embodiment includes applying a correction method only to the events that need to be corrected for the DOI.

Terms

An "energy spectrum" or "spectrum" can refer to a histogram of a number of events grouped into corresponding energy values measured by the medical imaging system during an imaging session. The energy values represent a measured charge for a select event. The energy spectrum includes a number of events having the corresponding energy values. For example, the energy spectrum can be shown graphically as the number of events versus the measured energy values.

An "energy window" is a predetermined range of energy values of the energy spectrum for medical imaging that may include the spectrum peak. The predetermined range of energy values can correspond to anatomical structures within a patient.

A "low energy tail" can refer to a range of energy values of the energy spectrum remote from a peak of the energy spectrum and/or outside the energy window. The low energy tail is formed mainly from the dependency of the energy value (e.g., charge) on a location of the DOI of where the photon is absorbed within a pixelated radiation detector.

A "solid viewing angle" can refer to an orientation and/or angle of a location of an event and/or a negative charge cloud relative to a pixelated anode. The solid viewing angle is independent along X and Y-coordinates of the pixelated anode having the event. For example, the solid viewing angle of different (x, y) locations of events and/or the negative charge cloud within the pixelated anode can have similar and/or the same solid viewing angles with respect to each other.

Figure 2:
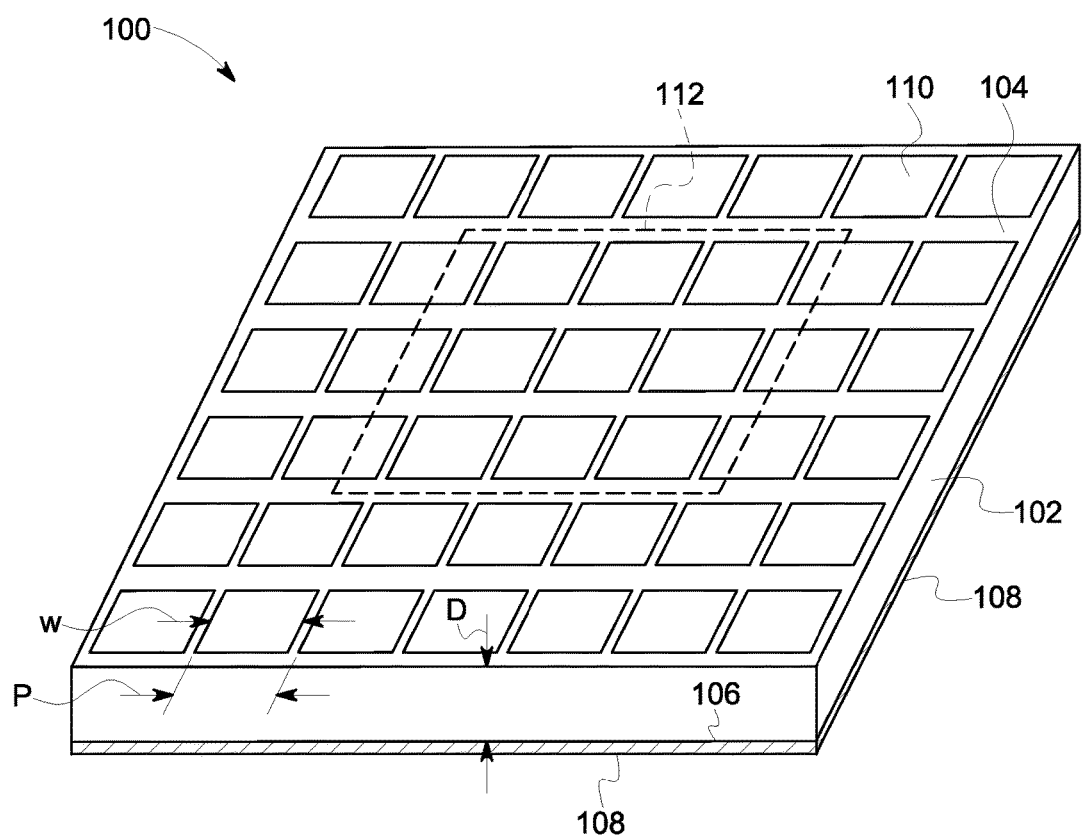
FIG. 2 is a peripheral view of an embodiment of a portion of a radiation pixelated detector.

FIGS. 1 and 2 illustrate a portion of a radiation pixelated detector (RPD) 100, in accordance with an embodiment. FIG. 1 illustrates a side view of the RPD 100, and FIG. 2 illustrates a peripheral view of the RPD 100. The RPD 100 includes a semiconductor plate 102. The semiconductor plate 102 may include CZT, CMT, HgI, Si, GaAr, Si, Ge, and/or the like. The semiconductor plate 102 includes first and second surfaces 104 and 106. A monolithic cathode contact 108 is overlaid on the second surface 106 of the semiconductor plate 102. The cathode 108 of the RPD 100 is biased by a negative high-voltage (e.g., "−HV"). Pixelated anodes 110, representing a plurality of pixels of the RPD 100, are overlaid on the first surface 104. The pixelated anodes 110 are shown having square shapes with dimensions of "W×W" and a pitch "P." Additionally or alternatively, the pixelated anodes 110 may be a circle, a triangle, a rectangle, and/or the like. The RPD 100 has a thickness "D" based on the semiconductor plate 102, which is designed to absorb radiation that includes photons (e.g., the photons 141 can be grouped into a plurality of photons 140) having energy within the range of ionizing radiation (e.g., X-Ray and/or Gamma Ray radiation).

An event occurs when a photon 141 interacts with the RPD 100, and the photon 141 is absorbed by the semiconductor 102. The absorbed photon 141 generates an electrical charge signal on one or more of the pixelated anodes 110, which is proportional to the energy of the absorbed photon 141. A pixelated anode 110 is operably coupled to a corresponding electronic channels 111. Additionally or alternatively, the electronic channels 111 may be operably coupled to more than one pixelated anode 110.

The electronic channels 111 are configured to process the electrical charge signal from the pixelated anodes 110 and form a voltage signal. The electronic channels 111 include charge sensitive preamplifiers (CSP) 109. The CSP 109 are configured to clamp the potential of the pixelated anodes 110 to a voltage that is equal to the voltage of a virtual ground of the CSP 109. For example, the CSP 109 clamps the voltage of the pixelated anodes 110 to a potential at and/or approximate to zero.

Figure 3:
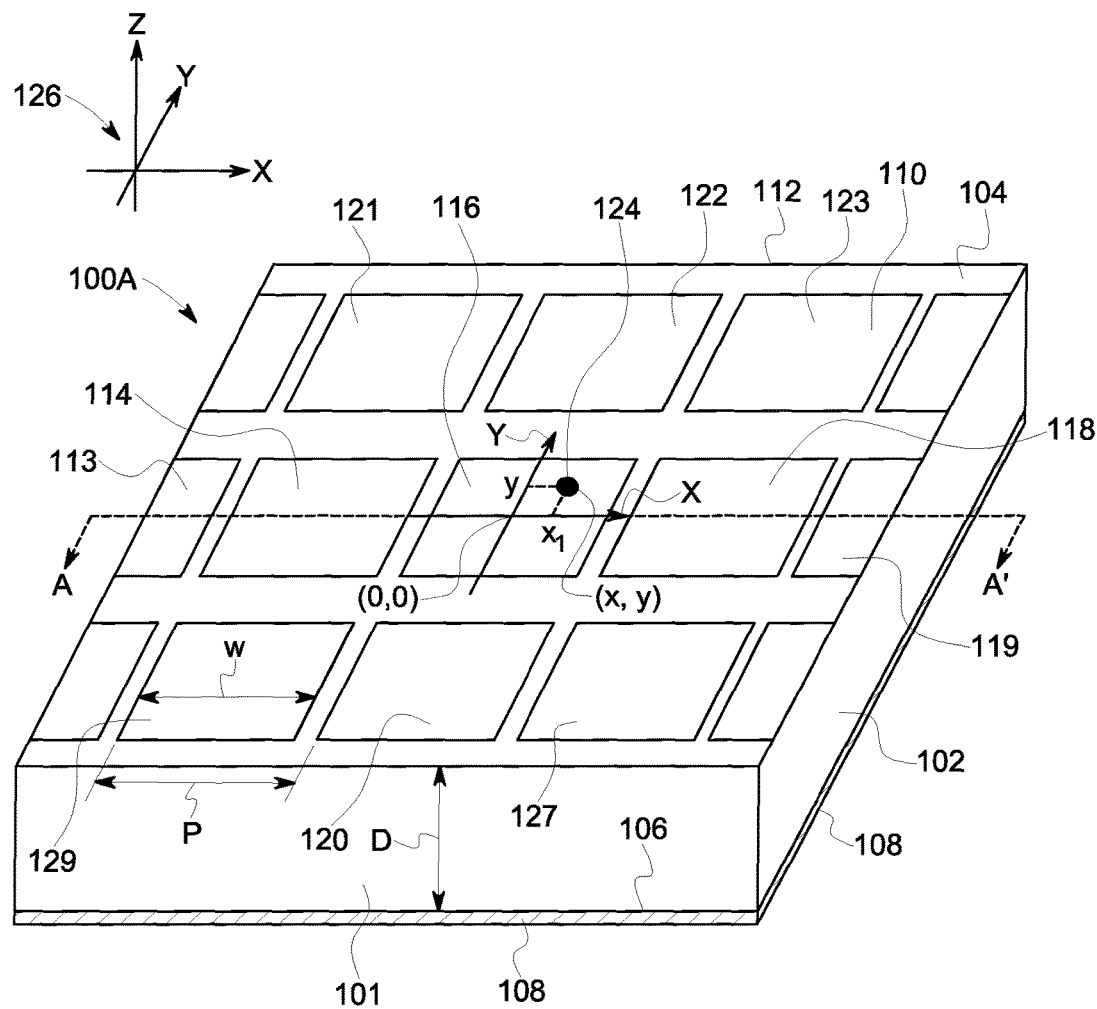
FIG. 3 is an expanded portion the radiation pixelated detector shown in FIG. 2.

FIG. 3 is an expanded portion 100A of the RPD 100 shown in FIG. 2, in accordance with an embodiment. The expanded portion is represented by a frame 112 shown in FIG. 2. The RPD 100 is shown aligned with an X, Y, Z Cartesian coordinate system 126. The expanded portion 100A includes the pixelated anodes 110 (e.g., the pixelated anodes 113, 114, 116, 118, 119, 122, 120). The pixelated anodes 113, 114, 116, 118, and 119 are aligned along an X-coordinate of the Cartesian coordinate system 126. The pixelated anodes 116, 120, and 122 are aligned along a Y-coordinate of the Cartesian coordinate system 126. The expanded portion 100A includes sidewalls 101 of the semiconductor plate 102. The sidewalls 101 have a thickness D, which is aligned along the Z-coordinate between the first and second surfaces 104, 106.

The expanded portion 100A of the RPD 100 includes an event 124. The photon 141 is absorbed by the pixelated anode 116 creating the event 124. The pixelated anodes 114, 118 are adjacent to the pixelated anode 116. For example, the pixelated anodes 114, 118 are on opposing sides of the pixelated anode 116 along the X-coordinate. The event 124 is located at a coordinate of (x1, y, z) within the pixelated anode 116. The coordinates are determined relative to an origin position based on the pixelated anode 110, which absorbs the photon 141. For example, the coordinate of the event 124 is based on a position relative to the pixelated anode 116. The values along the X and Y-coordinates are measured relative to an origin at a center of the pixelated anode 116. The value along the Z-coordinate is measured relative to the second surface 106. For example, the zero value of the z coordinate is located on the intersection point between the Z-coordinate and the second surface 106.

The point where the photon 141 is absorbed (e.g., the event 124) produces negative and positive charge clouds. The pixelated anode 116 collects electrons within the negative charge cloud to form the collected energy signal. For example, the negative charge cloud drifts towards the pixelated anode 116 based on the high voltage bias between the cathode 108 and the pixelated anode 116. The pixelated anodes 114, 118 adjacent to the pixelated anode 116, generate an adjacent energy signal. The adjacent energy signal is produced by the induction of the electrical charge signal as the negative charge cloud drifts towards the pixelated anode 116.

As described herein, the collected energy signal weakly depends and/or is independent on a location of the event 124 along the X and Y-coordinates of the pixelated anode 116. The adjacent energy signal depends on the location of the event 124 along the X and Y-coordinates of the pixelated anode 116. It may be noted as described herein a sum of the adjacent energy signals from adjacent pixels located symmetrically on both sides of the collecting pixel. For example, the pixelated anodes 114 and 118 are adjacent to the pixelated anode 116, which is the location of the event 124. By summing the adjacent energy signals, the location of the event weakly depends and/or is independent on the location of the event 124 along the X and Y coordinates of the pixelated anode 116. The collected energy signal and the adjacent energy signal depend on the location of the event 124 along the Z-coordinate. For example, the location of the event 124 along the Z-coordinate corresponds to the DOI of the event 124.

Figure 4:
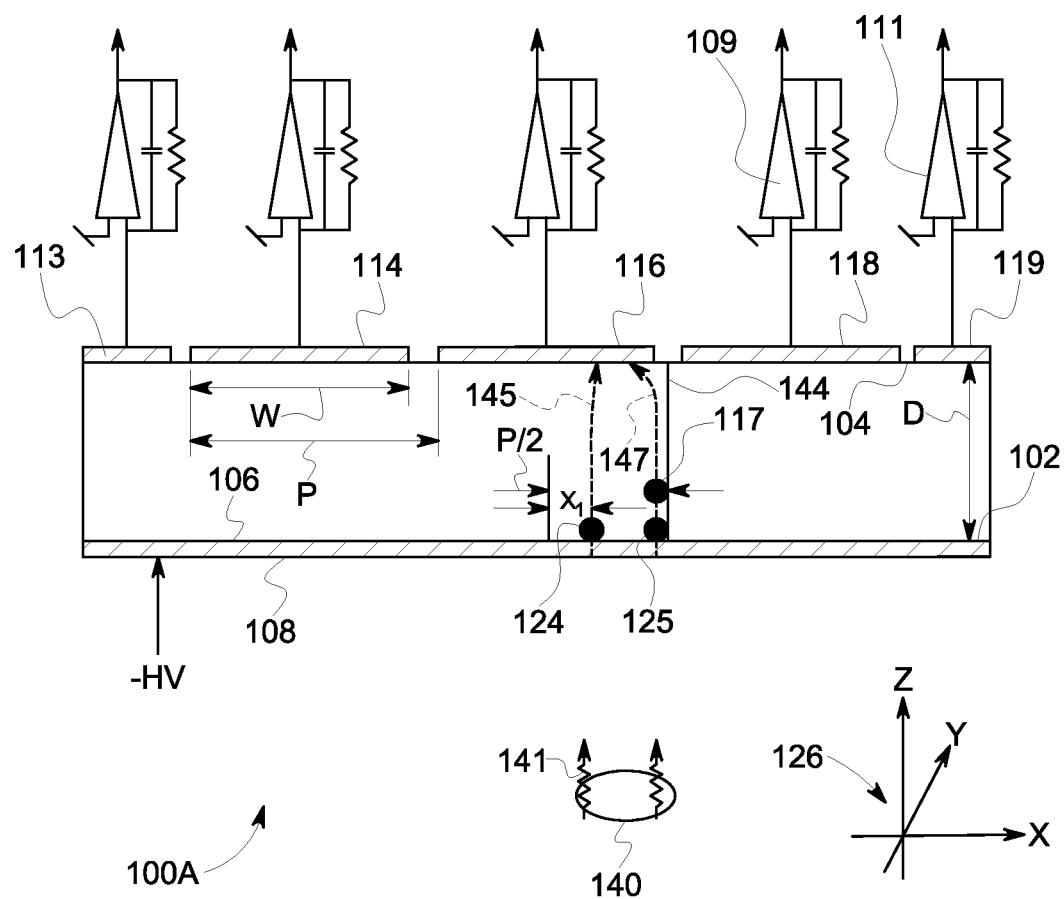
FIG. 4 is a side view of the expanded portion shown in FIG. 3.

FIG. 4 is a side view of the expanded portion 100A, in accordance with an embodiment. The side view represents a cross-section along the line A-A' shown in FIG. 3. The event 124 is located at a coordinate (x1, y, z). The y coordinate is not specified. The collected energy signal and the adjacent energy signal are independent of the location of the event 124 along the Y-coordinate. The X coordinate is measured relative to the center of the pixelated anode 116. The location of the event 124 being at the second surface 106 corresponds to a z coordinate of zero.

The point where the photon 141 is absorbed (e.g., at the event 124) produces the negative and positive charge clouds. The negative and positive charge clouds correspond to electrical charges −q and +q, respectively. The electrical charge signal of the negative and positive charge clouds are proportional to the energy of the photon 141 absorbed by the pixelated anode 116. The collected energy signal of the pixelated anode 116 and the adjacent energy signal of the pixelated anodes 114, 118 are generated by the drift of the negative charge cloud towards the pixelated anodes 110 and the drift of the positive charge cloud toward the cathode 108. The amount of the electrical charge signal that the positive and negative charge clouds contribute (e.g., by induction) to the collected and adjacent energy signals are proportional to a length of the distance that the charge clouds travel toward the pixelated anode 110 and the cathode 108, respectively. It may be noted that the potential of the pixelated anodes 110 and the cathode 108 is based on the −HV bias supplied to the cathode 108.

Optionally, a type of the semiconductor plate 102 may affect a rate of drift of the positive and negative charge clouds. For example, the semiconductor plate 102 can include CZT, which reduces a mobility of the positive charge cloud relative to the negative charge cloud. Optionally, the positive charge cloud may be static. Accordingly, the positive charge cloud may not contribute to the electrical charge signal of the collected and adjacent energy signals. For example, the collected and adjacent energy signals may be based only on the negative electron cloud.

Additionally or alternatively, the −HV bias on the cathode 106 may be configured to generate an electrical field within the semiconductor plate 102 to be free of electron traps. The −HV bias allows the negative charge cloud to drift along a drift path 145 from the cathode 108 to the pixelated anode 116 along a distance "D" enabling a complete charge collection. The complete charge collection occurs when all of the electrons of the negative charge cloud is absorbed by the pixelated anode 110. For example, a rate that the negative charge cloud drifts along the drift path 145 to the pixelated anode 116 is shorter than an electron lifetime τ of the electrons of the negative charge cloud. Based on the rate, all of the electrons are absorbed by the pixelated anode 116, which represents the complete charge collection.

The complete charge collection of the collected energy signal is equal to the induced charge of the electron in the negative charge cloud generated by the event 124. Additionally, the complete charge collection is proportional to the distance "D" traversed by the negative charge cloud along the drift path 145 of the negative charge cloud. Concurrently as the negative charge cloud traverses along the drift path 145, an electrical charge is induced on the pixelated anodes 114, 118. The electrical charge induced on the pixelated anodes 114, 118 represents the adjacent energy signal. The adjacent energy signal is proportional to the distance D. It may be noted that the electrons of the negative charge cloud are not collected by the pixelated anodes 114 and 118. The location of the event 124 relative to the pixelated anode 116 is more proximate relative to the pixelated anodes 114, 118. For example, the pixelated anodes 114, 118 are remote relative to the location of the event 124 compared to the pixelated anode 116.

Figure 7:
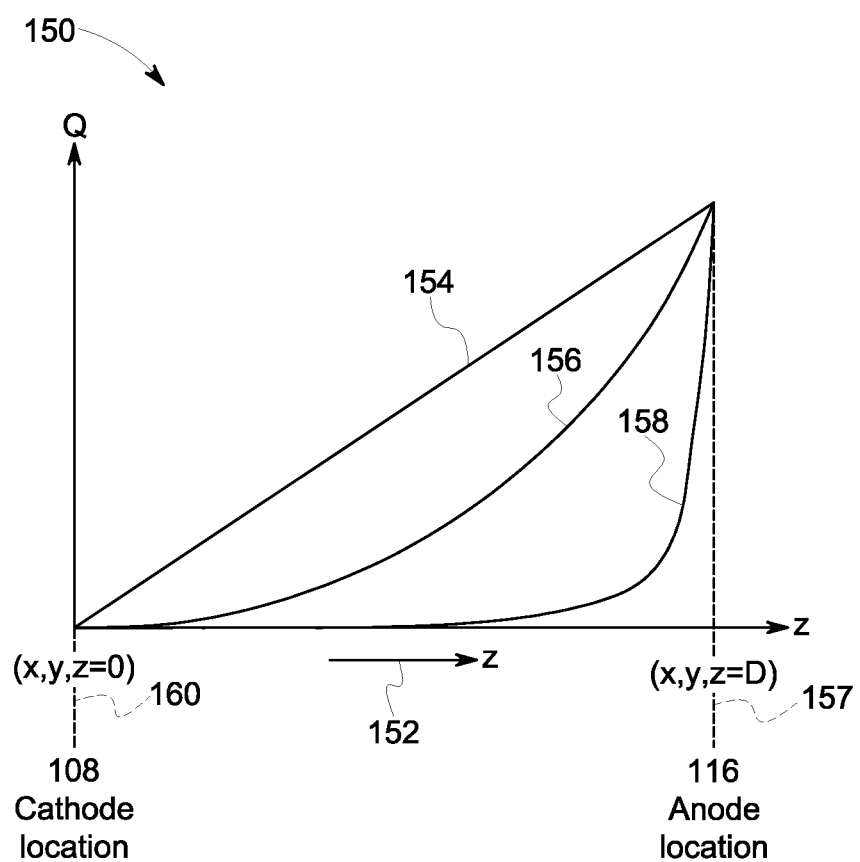
FIG. 7 is a graphical illustration of a charge of a pixelated anode based on a distance traversed by a negative charge cloud.

It may be noted that for large pixels, as shown in FIG. 7 the collected energy signal 154, both the collected and adjacent energy signals of the event 124 are proportional to the distance "D" that the negative charge cloud traverses along the drift path 145. Each of the pixelated anodes 114, 116, 118 have different solid viewing angles relative to the event 124. For example, a solid viewing angle of the pixelated anodes 114, 118 is smaller relative to a solid viewing angle of the pixelated anode 116. The viewing angles of the pixelated anode 116 are dependent on a value of a Z-coordinate and weakly dependent along the X and Y-coordinates of the event 124. As the negative charge cloud drifts toward the pixelated anode 116 the Z-coordinate change. The solid viewing angle of the Z-coordinates to collecting anode 116 is weakly dependent and/or independent on the location of event 124 along the X and Y coordinates. For the same value of coordinate Z mentioned above, the solid viewing angles from the event 124 to adjacent non-collecting anodes 114 and 118 are dependent on the location of event 124 along the X-coordinate but, are weakly dependent and/or independent on the Y-coordinate of the event 124. Accordingly, the solid viewing angles of the pixelated anodes 114, 116, 118 weakly depend and/or are independent on the location of the event 124 along the Y-coordinate. The solid viewing angle of the pixelated anodes 114, 116, 118 depend on the value along the Z-coordinate, which is equal to the DOI. The electrical charge induced on the pixelated anodes 110 of the RPD 100 is proportional to an integral along coordinate Z, in a range starting from the location of the event 124 and ending at the corresponding pixelated anode 110. The integral is calculated over the solid viewing angles as a function of the Z-coordinates along the trajectory of the negative charge cloud to the corresponding pixelated anode 110.

For example, the location of the event 124 in the pixelated anode 116. The electrical charge induced on the pixelated anodes 116 represents the integral from the location where event 124 was created (e.g., located at the absorption location of photon 141) and ends at the pixelated anode 116 along the Z-coordinates. In this range of Z-coordinates, the integral is performed over the viewing angles from the event 124 to the pixelated anode 116 as a function of Z (e.g., DOI) along the drift path 147 of the negative charge cloud. The collected energy signal induced on the pixelated anode 116 is independent on the location of event 124 along the X-Y plane and the adjacent energy signals induced on the adjacent pixelated anodes 114, 118 are dependent on the location of the event 124 along the X-coordinate, but are independent on the Y-coordinate.

In connection with the event 124 shown in FIG. 4, the difference in the solid viewing angles results in magnitudes of the adjacent energy signals induced on the pixelated anodes 114, 118 is smaller than the collected energy signal of the pixelated anode 116. The adjacent energy signal of the pixelated anodes 114, 118 are shown in connection with Equations 1 and 2.

$$V_{118} = V_0 + \alpha \cdot x \qquad \text{Equation (1)}$$

$$V_{114} = V_0 - \alpha \cdot x \qquad \text{Equation (2)}$$

The variable $V_{118}$ of Equation 1 represents the adjacent energy signal of the pixelated anode 118 as a function of a value of the X-coordinate measured from the center of the pixelated anode 116. The variable $V_{114}$ of Equation 2 represents the adjacent energy signal of the pixelated anode 114 as a function of a value of the X-coordinate measured from the center of pixelated anode 116. The constant $V_0$ represents a value of the induced electrical charge measured at the pixelated anodes 114, 118 when the cross-section between the X-Y plane and the trajectory along which event 124 drift is at point x=0 and y=0 at the center of pixel 116. The constant α represents the linearity coefficient of the RPD 100. The adjacent energy signals defined in Equations 1 and 2 have positive and negative linearity coefficients, respectively. For example, the electrical charges induced on the pixelated anodes 114, 118 depend on the location of the event 124 along the X-coordinate. The sum of the adjacent energy signals of the pixelated anodes 114, 118, as shown in Equation 3, results in a sum of the adjacent energy signals, which is independent along the X-coordinate.

$$V_{114} + V_{118} = 2 \cdot V_0 \qquad \text{Equation (3)}$$

The collected energy signal from the pixelated anode 116 and the sum of the adjacent energy signals from the pixelated anodes 114, 118 are both independent on the location of the event 124 along the X and Y-coordinates, but depend on the location along the Z-coordinate. The dependency of the collected energy signal on the location of the event 124 along the Z-coordinate, representing the DOI, is undesired and produces the low energy tail. For example, the low energy tail is produced when photons having the same energy produce different induced charges on the collected energy signal based on the DOI. The low energy tail is measured by the RPD 100 at different energies and appear as a tail in an energy spectrum that is remote from a peak of the energy spectrum.

For events located within the pixelated anode 116, a difference between the collected energy signal and the sum of the adjacent energy signals (e.g., measures by the adjacent pixelated anodes 114, 118) is represented as the variable ΔV, in Equation 4. As described herein, the difference between the collected energy signal and the sum of the adjacent energy signals can be used to reduce the low energy tail.

$$\Delta V = V_{116} - C \cdot (V_{118} + V_{114}) \qquad \text{Equation (4)}$$

The variable $V_{116}$ of Equation 4 represents the collected energy signal, and the variables $V_{114}$ and $V_{118}$ represents the adjacent energy signals of the pixelated anodes 114, 118, respectively. The variable C represents the adjusting factor. The adjusting factor may range from values larger, smaller, and/or equal to one.

When the difference (e.g., ΔV) is zero, the photons for a plurality of events along a range are absorbed by the RPD 100. The range is along the Z-coordinate. The range represents where the photons are absorbed in the RPD 100 above the cathode 108. For example, the range represents when the sum of the solid viewing angles of the adjacent pixelated anodes 114 and 118 are approximately the same as the viewing angle of collecting pixel 116. Within the range, the absorption of the photons are distant relative to the pixelated anodes 114, 116, 118, which produces the solid viewing angle of the pixelated anode 116 that is approximately equal to the sum of the solid viewing angles of pixelated anodes 114 and 118. Based on the same solid viewing angles, the electrical charges of the pixelated anodes 114, 116, 118 produces a difference (e.g., ΔV) equal to zero. Additionally or alternatively, the difference (e.g., ΔV) is not equal to zero at a second range when the negative charge cloud drifts towards the pixelated anodes 114, 116 and 118.

The expanded portion 100A of FIG. 3 includes a second event 125. The second event 125 is at a location having coordinates (P/2−Δx, y, z). The y coordinate is not specified. The collected energy signal and the adjacent energy signal are independent of the location of the second event 125 along the Y-coordinate. The X-coordinate is measured relative to the center of the pixelated anode 116. The location of the second event 125 being at the second surface 106 corresponds to a Z-coordinate of zero.

The line 144 is a symmetry line between the pixelated anodes 116, 118. The symmetry line defines a separation between the two adjacent pixelated anodes 116, 118. For example, the line 144 is located at a distance P/2 from the center of the pixelated anode 116. When a photon is absorbed at the line 144 or at a distance from line 144 that is smaller than the diameter of the electrons cloud, the resulting event represent a charge sharing event. The negative charge cloud resulting from the absorbed photon (e.g., the event) is divided between the two adjacent pixelated anodes 116, 118. For example, a portion of the negative charge cloud positioned on a left side of the line 144 (e.g., positioned within the pixelated anode 116) is drifted toward the pixelated anode 116. In another example, a portion of the negative charge cloud positioned on a right side of the line 144 (e.g., positioned within the pixelated anode 118) is drifted toward the pixelated anode 118. Based on the partition of the negative charge cloud, the charge induced by the negative charge cloud on the pixelated anode 116, 118 is split. The split charge collected by the pixelated anodes 116, 118 can be recovered as an event in one of the pixelated anodes 116, 118.

For additional discussion regarding charge sharing events and sub-pixel location determinations are described in U.S. patent application Ser. No. 14/627,436, entitled "Systems and Methods for Improving Energy Resolution by Sub-Pixel Energy Calibration," filed 20 Feb. 2015; U.S. patent application Ser. No. 14/724,022, entitled "Systems and Methods for Charge-Sharing Identification and Correction Using a Single Pixel," filed 28 May 2015; and U.S. patent application Ser. No. 15/280,640, entitled "Systems and Methods for Sub-Pixel Location Determination," filed 29 Sep. 2016, which are hereby incorporated by reference in their entirety.

The location of the second event 125 is removed from the line 144 by a distance of Δx. The distance is larger than a diameter of the negative charge cloud, and does not represent the charge sharing event. For example, the electrons of the negative charge cloud is not shared between the adjacent pixelated anodes 116, 118. The negative charge cloud formed at the second event 125 traverses along a drift path 147. The drift path 147 extends a distance "D" between the first and second surfaces 104, 106. Optionally, all of the charge from the negative charge cloud is collected by the pixelated anode 116. For example, the pixelated anode 116 has the complete charge collection for the second event 125. Concurrently, the second event 125 induces a charge on the adjacent pixelated anodes 114, 118. The location of the second event 125 is more proximate to the pixelated anode 118 relative to the pixelated anode 114. For example, the solid viewing angles of the pixelated anodes 114, 118 are different. Based on the proximity of the second event 125 to the pixelated anode 118, the induced charge on the pixelated anode 118 is greater than the pixelated anode 114.

The expanded portion 100A includes a third event 117. The third event 117 is at a location having coordinates (P/2−Δx, y, $z_1$). The Y-coordinate is not specified. The collected energy signal and the adjacent energy signal are independent of the location of the third event 117 along the Y-coordinate. The X-coordinate is measured relative to the center of the pixelated anode 116. The location of the third event 117 is at a positon Z=1 along the Z-coordinate.

The negative charge cloud formed by the third event 117 drifts towards the pixelated anode 116. Similar to the second event 125, the negative charge cloud of the third event 117 drifts along the drift path 147. However, the locations representing the DOI of the second and third events 125, 117 are different along the Z-coordinate of the events 125, 117. For example, the negative charge cloud of the third event 117 drifts a shorter distance along the drift path 147 relative to the negative charge cloud of the second event 125. Based on the difference in positions along the Z-coordinate, the charges on the pixelated anodes 114, 116, 118 are different. For example, the charge of the pixelated anode 116 and the induced charge on the pixelated anodes 114, 118 will be smaller for the third event 117 relative to the second event 125.

A charge of the negative charge clouds of the second and third events 125, 117 are the same. The difference in locations of the second and third events 125, 117 along the Z-coordinate adjusts the charges collected by the pixelated anodes 114, 116, 118. For example, the difference in locations of the events 125, 117 along the Z-coordinates have different DOIs. The difference in charge collected by the pixelated anode 116 between the second and third events 125, 117 forms the low-energy tails of the energy spectrum of the RPD 100.

As described herein, the difference between the collected energy signal and the sum of the adjacent energy signals can be used, which is independent on the locations (e.g., independent of the DOI) of the events (e.g., the event 124, the second event 125, the third event 117). For example, the difference can be used as a signal of events to produce a spectrum of the RPD 100 to reduce low energy tails.

Figure 5:
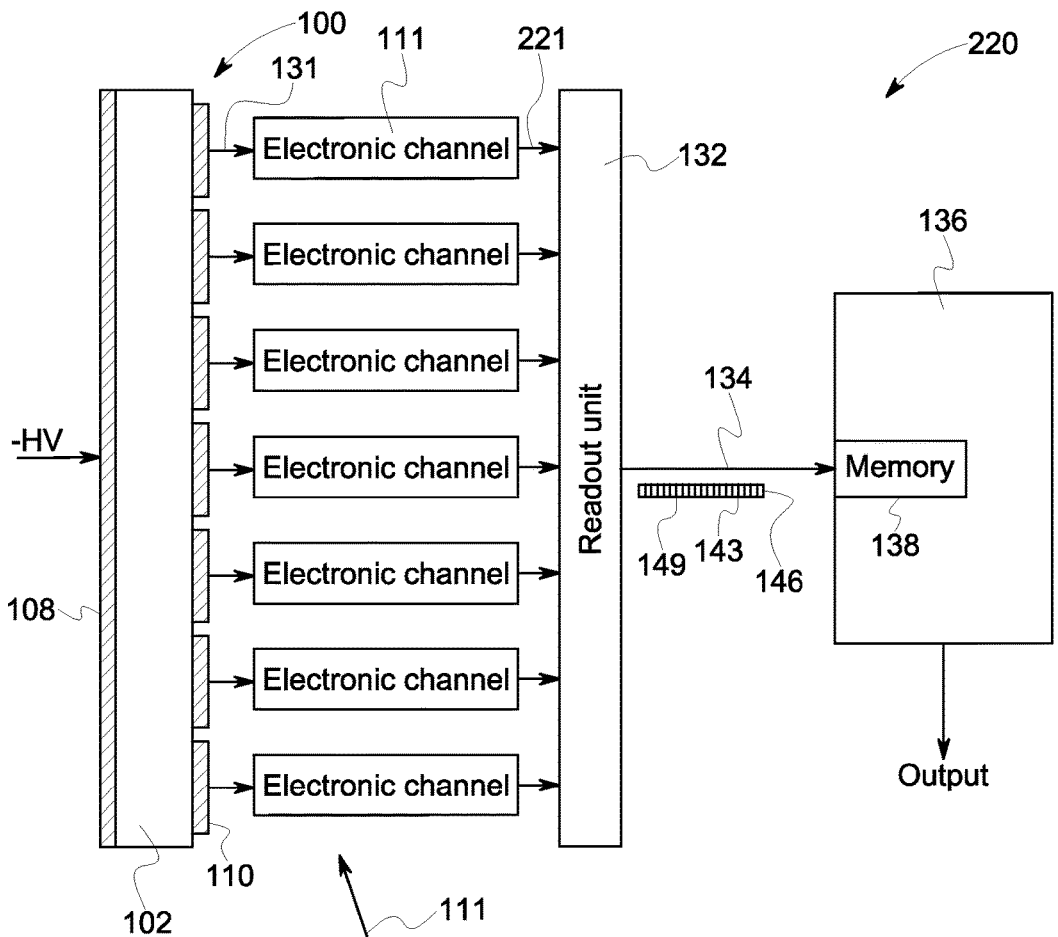
FIG. 5 is a schematic illustration of an embodiment of a radiation pixelated detector having electronic channels operably coupled to a controller circuit.

FIG. 5 is a schematic illustration 220 of an embodiment of the RPD 100 having the electronic channels 111 operably coupled to a controller circuit 136, in accordance with an embodiment. The schematic illustration 220 includes a readout unit 132 and a memory 138. The electronic channel 111 may include one or more processors. Optionally, the electronic channels 111 may include a central processing unit (CPU), one or more microprocessors, or any other electronic component capable of processing input data according to specific logical instructions. Optionally, the electronic channels 111 may include and/or represent one or more hardware circuits (e.g., analog components) or circuitry that include, are connected with, or that both include and are connected with one or more processors, controllers, and/or other hardware logic-based devices. Additionally or alternatively, the electronic channels 111 may execute instructions stored on a tangible and non-transitory computer readable medium.

The pixelated anodes 110 of the RPD 100 are electrically and/or operably coupled to the electronic channels 111 via interconnections 131. The interconnections 131 are configured to clamp a voltage potential of the pixelated anodes 110 to be equal to a virtual ground (e.g., approximately zero) of charge sensitive pre-amplifiers (CSP) 109, shown in FIG. 6. The electronic channels 111 receive the electrical charge signals measured by the pixelated anodes 110 via the interconnections 131.

The electronic channels 111 are electrically and/or operably coupled to the readout unit 132. The readout unit 132 is configured to collect the voltage signals received from the electronic channels 111, and to convert the analog values of the voltage signals into digital values. For example, the readout unit 132 may include analog to digital converters. Optionally, the readout unit 132 may be integrated with the electronic channels 111 and/or the controller circuit 136. The readout unit 132 is configured to generate a digital addresses associated with each of the digital values. The digital address corresponds to one of the pixelated anodes 110 that generated an electrical charge signal in response to the event. The readout unit 132 is configured to generate a data packet 146 representative of the voltage signals. The data packet 146 may include a header 143 containing an address representing a location of the pixelated anode 110 on the RPD 100. The data packet 146 includes a payload 149. The payload 149 includes the digital values generated by the readout unit 132 representative of the voltage signal produced by the pixelated anode 110.

The data packets 146 are transmitted from the readout unit 132 via a port 134 to the controller circuit 136 and stored in the memory 138. The controller circuit 136 may include a central processing unit (CPU), one or more microprocessors, or any other electronic component capable of processing input data according to specific logical instructions. Optionally, the controller circuit 136 may include and/or represent one or more hardware circuits or circuitry that include, are connected with, or that both include and are connected with one or more processors, controllers, and/or other hardware logic-based devices. Additionally or alternatively, the controller circuit 136 may execute instructions stored on a tangible and non-transitory computer readable medium (e.g., the memory 138).

The data packets 146 in the memory 138 are analyzed by the controller circuit 136. For example, the controller circuit 136 is configured to execute one or more models and/or algorithms stored in the memory 138 that may include, charge-sharing correction, low-energy tail correction, image reconstruction, and/or the like as described herein to process the digital values and generate the image data.

Figure 6:
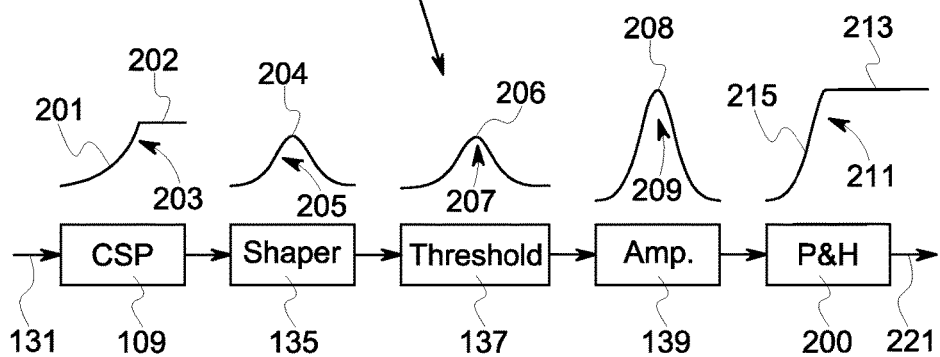
FIG. 6 is a schematic illustration of an embodiment of operations performed by the electronic channels shown in FIG. 4.

FIG. 6 is a schematic illustration of the operations performed by the electronic channels 111, in accordance with an embodiment. The electronic channels 111 is shown performing a plurality of operations shown as the CSP 109, a shaper circuit 135, thresholding circuit 137, amplifier circuit 139, and a peak and hold (P&H) circuit 200 to process the electrical charge signals received from the interconnections 131. The operations may correspond to operations performed by one or more processors by the electronic channels 111 and/or be configured hardware (e.g., ADC converters, amplifiers, filters) of the electronic channels 111.

The CSP 109 is configured to integrate the electrical charge signal from the pixelated anodes 110. An integrated signal 203 is representative of an integrated electrical charge signal by the CSP 109. The electrical charge signal is integrated over time 201 by the CSP 109 to define the integrated signal 203. Based on the integration of the electrical charge signal, the integrated signal 203 reaches a steady state value 202. The steady state value 202 represents the total induced charge collected by the pixelated anodes 110. The lowest potential of the pixelated anode 110, for example, is determined by the CSP 109, which is configured to clamp the potential of the pixelated anodes 110 to a voltage that is equal and/or similar to the voltage of the virtual ground of the CSP 109.

The integrated signal 203 is passed to the shaper circuit 135. The shaper circuit 135 is configured to filter the integrated signal 203 (e.g., band-pass filter) to increase a signal to noise ratio of the integrated signal 203. For example, the filtering by the shaper circuit 135, changes the integrated signal 203 to form a filtered signal 205 (e.g., a Gaussian shape having an amplitude 204).

The filtered signal 205 is passed to the threshold circuit 137. The threshold circuit 137 is configured to pass the amplitude 204 of the filtered signal 205 to the amplifier circuit 139 when the amplitude 204 is above a predetermined non-zero threshold, or to block the amplitude 204 when the amplitude 204 is below the predetermined non-zero threshold. An amplitude 206 of a thresholded signal 207 may be equal to or larger than the amplitude 204 of the filtered signal 205, which depends on the amplification of the threshold circuit 137. The thresholded signal 207 is passed to the amplifier circuit 139. The amplifier circuit 139 is configured to amplify the thresholded signal 207 by increasing the amplitude 206. For example, the amplifier circuit 139 increases the amplitude 206 of the thresholded signal 207 to form an amplified signal 209 having an increased amplitude 208.

The amplified signal 209 is passed to the P&H circuit 200. The P&H circuit 200 is configured to amplify the amplified signal 209 to hold a maximum value of the amplified signal 209 corresponding to and/or about the amplitude 208 to form the voltage signal 211. The voltage signal 211 includes a rising portion 215 and a peak value 213. The peak value may be similar to and/or about the amplitude 208. The voltage signal 211 is received by the readout unit 132.

The payload 149 of the data packet 146 includes digital values of the peak value 213 of the voltage signal 211, which is stored later in the memory 138. Optionally, the payload 149 may include the amplitudes 202, 204, 206, 208 of the signals 203, 205, 207, 209, respectively. The peak value 213 of the pixelated anodes 110 is a representation of the electrical charge of the photon absorbed by the RPD 100.

FIG. 7 is a graphical illustration 150 of an induced charge on the collecting pixelated anode 116 based on a distance traversed by a negative charge cloud, in accordance with an embodiment. The distance traversed by the negative charge cloud along the drift path 145 is along the Z-coordinate from the cathode 108 to the pixelated anode 116. A direction of the drift is shown as a direction of an arrow 152. The negative charge cloud is formed by the absorption of the photon 141 in the pixelated anode 116.

The charge on the collecting pixelated anode 116 is independent on the location of the event 124 along the X and Y-coordinates. The independency of the charge is based on the solid viewing angles. Different (x, y) locations of events within the pixelated anode 116 have similar viewing angles to the pixelated anode 116 from the different locations of the events 124, 125, 117. Accordingly, the different locations of the events, along the X and Y-coordinates have the same and/or similar solid viewing angles with respect to the pixelated anode 116. Based on the independency relative to the X and Y-coordinates, the location of the event 124 at (x, y) of the pixelated anode 116 are not shown in the graphical representation 150.

A line 160 indicates the location of the event 124 along the Z-coordinate. For example, the line 160 is positioned at the cathode 108 representing a coordinate z=0. A line 157 indicates a location of the pixelated anode 116. For example, the line 157 has a position along the Z-coordinate of z="D," which is a thickness of the semiconductor 102.

Collected energy signals 154, 156, 158 illustrate different charges of the pixelated anode 116 based on a distance the negative charge cloud drifts from the cathode 108 the pixelated anode 116. The collected energy signals 154, 156, 158 represent signals measured by the pixelated anode 116 having different dimensions of the pixelated anode 116. The collected energy signals 154, 156, 158 collected by the pixelated anode 116 having different dimensions W×W relative to the thickness "D" of the semiconductor 102.

The pixelated anode 116 of the collected energy signal 154 has dimensions W×W that are larger than the thickness "D" of the RPD 100. For example in the collected energy signal 154, an aspect ratio of the dimensions W/D is greater than one. The charge of the collected energy signal 154 is shown increasing linearly as the negative charge cloud traverses to the pixelated anode 116.

The pixelated anode 116 of the collected energy signal 156 has dimensions W×W representing an aspect ratio W/D that is equal to 0.5. The charge of the collected energy signal 156 is shown increasing non-linearly as the negative charge cloud traverses to the pixelated anode 116.

The pixelated anode 116 of the collected energy signal 158 has dimensions W×W that are less than the thickness "D" of the RPD 100. For example, a ratio of the dimensions W×W representing aspect ratio W/D that is less than 0.5. The charge of the collected energy signal 158 is shown increasing exponentially as the negative charge cloud traverses to the pixelated anode 116.

Figure 8:
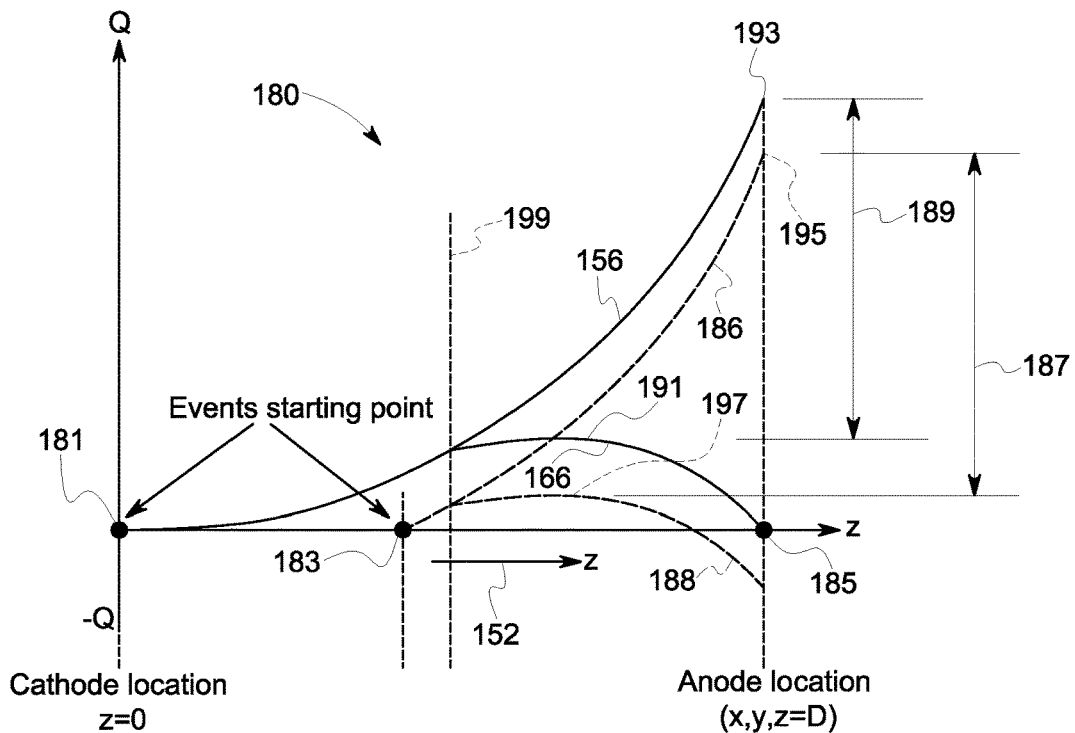
FIG. 8 is a graphical illustration of an embodiment of collected energy signals and adjacent energy signals.
Figure 9:
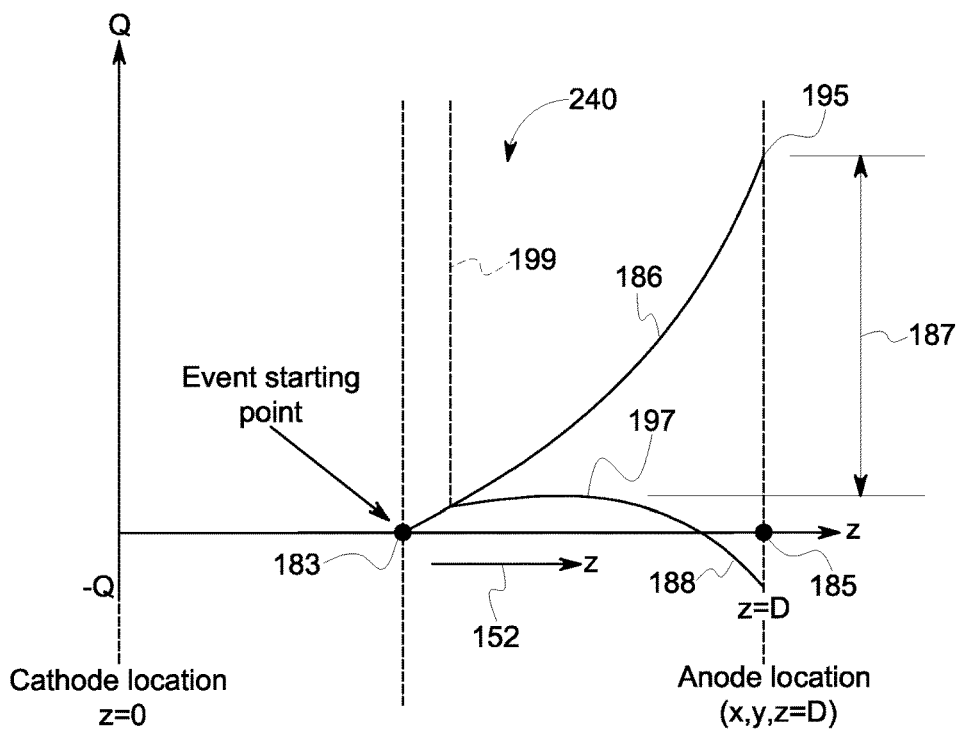
FIG. 9 is a graphical illustration of an embodiment of a collected energy signal and an adjacent energy signal.

FIGS. 8 and 9 are graphical illustrations 180, 240 of collected energy signals 156, 186 and adjacent energy signals 166, 188, in accordance to embodiments herein. The collected energy signals 156, 186 represent charges (e.g., Q shown along the vertical axes) measured at the pixelated anode 116. The adjacent energy signals 186, 188 represent induced charges collected by the pixelated anode 118, which is adjacent to the pixelated anode 116. The collected energy signals 156, 186 and the adjacent energy signals 166, 188 show changes in the charge received by the pixelated anodes 116, 118 along the Z-coordinate. For example, the charge of the collected energy signals 156, 186 and the adjacent energy signals 166, 188 increases as the negative charge cloud traverses towards the pixelated anodes 116, 118, which is shown along the arrow 152. The pixelated anodes 116, 118 of the graphical illustrations 180, 240 are configured to have an aspect ratio of W/D=0.5. For example, the pixelated anodes 116, 118 have the same aspect ratio W/D=0.5 as the pixelated anode 116 of the collected energy signal 156 in FIG. 7.

The collected energy signal 156 is based on the second event 125. For example, the negative charge cloud is formed at the location (e.g., P/2−Δx, y, z) of the second event 125. The collected energy signal 156 starts at point 181 proximate to the cathode 108 of the RPD 100, which represents a coordinate of z=0. The charge of the collected energy signal 156 increases as the negative charge cloud traverses towards the pixelated anode 116. The collected energy signal 156 ends at point 185 representing a position of the pixelated anodes 116, 118. A distance between the points 181, 185 represents the thickness "D" of the RPD 100. The collected energy signal 156 reaches a peak 193 at the point 185.

Similarly, the adjacent energy signal 166 is based on the second event 125. The adjacent energy signal 166 starts at the point 181 and ends at the point 185. The adjacent energy signal 166 represents the induced charge on the pixelated anode 118 based as the negative charge cloud drifts to the pixelated anode 116. The induced charge on the pixelated anode 118 increases as the negative charge cloud traverses from the cathode 108 to the pixelated anode 116. For example, as the negative charge cloud traverses along the drift path 147, the solid viewing angle increases with respect to the pixelated anode 118.

At a point 199 along the Z-coordinate, the solid viewing angle of the pixelated anode 118 decreases. For example, as the negative charge cloud traverses to the pixelated anode 116 a distance between the negative charge cloud and the pixelated anode 118 changes. Between the points 181 and 199, the negative charge cloud traverses to the pixelated anode 116. The distance between the negative charge cloud and the pixelated anode 118 decreases. Based on the decrease in distance, the induced charge on the pixelated anode 118 increases reaching a peak 191. Subsequent to the point 199 as the negative charge cloud drifts to the pixelated anode 116, the distance between the negative charge cloud and the pixelated anode 118 increases. The increase in the distance, further decreases the solid viewing angle of the pixelated anode 118. The decrease in the solid viewing angle decreases the induced charge on the pixelated anode 118. For example, the charge induced on the pixelated anode 118 has a different polarity or negative charge. The change in polarity of the charge induced on the pixelated anode 118 occurs at the point 199. Based on the changes in polarity of the induced charge, the peak 191 is formed by the adjacent energy signal 166. As the negative charge cloud traverses to the pixelated anode 116, the adjacent energy signal 166 continues to decrease to a charge of zero at the point 185. In the range between the point 181, where z=0, to the point 199, both energy signals 156 and 166 may have similar amplitudes and/or morphologies.

The peaks 193, 191 of the collected and adjacent energy signals 156, 166 are indicative of the peak value 213 determined by the P&H circuit 200 (FIG. 6) in the corresponding electronic channels 111. For example, the digital values (e.g., within the payload 149) of the peaks 193, 191 correspond to the peak value 213 stored in the memory 138 with corresponding addresses (e.g., within the header 143) representing the pixelated anodes 116, 118.

The collected energy signal 186 (FIG. 9) represents the charge (e.g., Q shown along the vertical axis) measured at the pixelated anode 116. The collected energy signal 156 is based on the third event 117. For example, the negative charge cloud is formed at the location (e.g., P/2−Δx, y, z=1) of the third event 117. The collected energy signal 186 starts at point 183, which represents a coordinate of z=1. The charge of the collected energy signal 186 increases as the negative charge cloud traverses towards the pixelated anode 116. Similar to the adjacent energy signal 156, the polarity of the induced charge changes at the point 199. The collected energy signal 186 ends at point 185 representing a position of the pixelated anodes 116, 118. The collected energy signal 186 reaches a peak 195 at the point 185.

The collected energy signals 156, 186 have different magnitudes of charges measured by the pixelated anode 116. For example, the collected energy signal 186 has a smaller electrical charge relative to the collected energy signal 156. The difference in electrical charges is based on the distance traversed by the negative charge clouds of the second event 125 and the third event 117, respectively. For example, the location of the third event 117 is at z=1 or the point 183. The location of the second event 125 is at z=0 or the point 181. The negative charge cloud of the second event 125 traverses the thickness D of the RPD 100 to the pixelated anode 116. The negative charge cloud of the third event 117 traverses from the point 183 to the pixelated anode 116. The distance traversed by the negative charge cloud of the third event 117 is less than the distance traversed by the negative charge cloud of the second event 125. As describe herein, the charge on the pixelated anode 116 increases based on the distance traversed by the negative charge cloud along the Z-coordinate. Based on the difference in the distances, the peak 193 is higher relative to the peaks 195.

Similarly, the adjacent energy signal 188 is based on the third event 117. The adjacent energy signal 188 starts at the point 183 and ends at the point 185. The adjacent energy signal 188 represents the induced charge on the pixelated anode 118 based on the negative charge cloud formed at the location of the third event 117. The induced charge on the pixelated anode 118 increases as the negative charge cloud traverses to the pixelated anode 116. For example, as the negative charge cloud traverses along the drift path 147, the solid viewing angle increases with respect to the pixelated anode 118.

Based on the shorter distance traversed by the negative charge cloud of the third event 117, the adjacent energy signal 188 ends at 185 with a negative charge. Between the points 183 and 199, the negative charge cloud of the third event 117 traverses to the pixelated anode 116, the charge induced on the pixelated anode 118 increases. The adjacent energy signal 188 reaches a peak 197. At the point 199, the solid viewing angle decreases and the distance of the negative charge cloud to the pixelated anode 118 increases. Based on the reduction in the solid viewing angle, the charge induced on the adjacent energy signal 188 decreases. For example, the charge induced on the pixelated anode 118 changes polarity and is negative. As the induced charge continues to decrease, the adjacent energy signal 188 ends at a negative charge at the point 185.

The difference in distances traversed by the negative charge clouds of the second and third events 125, 117 affects a magnitude of the peaks 191, 197. The peak 197 is smaller than the peak 191. A range of the adjacent energy signals 166, 188 are the same. For example, the range of charge between the peak 191 and the point 185 of the adjacent energy signal 166 is equal to a range of charge between the peak 197 and the point 185 of the adjacent energy signal 188. An amount of negative charge induced on the pixelated anode 118, represented in the ranges, on the adjacent energy signals 166, 188 are the same.

Additionally or alternatively, for different event locations the adjacent energy signals may or may not end with a negative induced charge at the point 185. For example, the adjacent energy signals end at a negative charge at the point 185 when the location of the events have a coordinate x close to P/2 and z=1 (e.g., the third event 117).

The peaks 195, 197 of the collected and adjacent energy signals 186, 188 are indicative of the peak value 213 determined by the P&H circuit 200 (FIG. 6) in the corresponding electronic channels 111. For example, the digital values (e.g., within the payload 149) of the peaks 195, 197 correspond to the peak value 213 stored in the memory 138 with corresponding addresses (e.g., within the header 143) representing the pixelated anodes 116, 118.

A difference between the peaks 193, 191 and 195, 197 of the collected and adjacent energy signals 156, 166 and 186, 188 represent a delta charge (e.g., ΔQ) 189, 187, respectively. For example, the delta charge 189 between the peaks 193, 191 of the collected and adjacent energy signals 156, 166, respectively. The delta charge 189 corresponds to the second event 125 located on and/or proximate to the cathode 108 (e.g., at z=0). In another example, the delta charge 187 between the peaks 195, 197 of the collected and adjacent energy signals 186, 188, respectively. The delta charge 189 corresponds to the third event 117 located at the point 183.

The delta charges 187, 189 are based on different events 125, 117, however, both are approximately equal to each other. For example, the delta charges 187, 189 based on the collected and adjacent energy signals 156, 188 and 186, 188 is independent of the location of the events 125, 117 along the Z-coordinate. The delta charges 187, 189 represent the difference, ΔV, as describe in Equation 4. Thereby, a value of the difference (e.g., ΔV) between the collected and adjacent energy signals 156, 186, 166, 188 is independent on the location of the events, for all the coordinates (x, y, z).

FIGS. 8 and 9 correspond to the events 125, 117 at (P/2−Δx, y, z=0) and (P/2−Δx, y, z=1), respectively. The locations of the events 125, 117 are proximate to the pixelated anode 118 and remote from the pixelated anode 114 along the X-coordinate. For example, the proximity of the events 125, 117 to the pixelated anode 118 represent a maximum and/or large charge induced on the pixelated anode 118 for the adjacent energy signals 166, 188. At the same time the induced signal on pixelated anode 114 is minimal and/or small. According to Equation 3, the sum of the adjacent energy signals from the pixelated anodes 114 and 118 is fixed and/or is equal to $2V_0$. For the events 125 and 117, the sum of the adjacent energy signals from the pixelated anodes 114, 118 is about equal to the signal from the pixelated anode 118 alone. Additionally or alternatively, the adjacent energy signal 166, 188, received only from the pixelated anode 118 for the events 125 and 117, is approximately equal to the sum of the adjacent energy signals received from the pixelated anodes 114, 118. For the events 125 and 117, the delta charges 187, 189 represent a difference of the collected energy signal of the pixelated anode 116 and the sum of the adjacent energy signals of the pixelated anodes 114, 118 (e.g., based on Equation 4). Thereby the delta charges 187, 189 are independent of the locations of the events 125, 117 along all the coordinates (x, y, z).

The collected and adjacent energy signals 156, 166 are the same from the point 181 to the point 199. The collected and adjacent energy signals 186, 188 are the same from the point 183 to the point 199. For example, the differences between the collected and adjacent energy signals 156, 166 and 186, 188 is zero (e.g., ΔV=0) between the points 181, 199 and the points 183, 199, respectively.

The charge deltas 187, 189 can be calculated based on integrals of the collected energy signals 156, 186. For example, the charge delta 187 for the third event 117 is equal to an integral along the Z-coordinate of the collected energy signal 186 between the points 199 and 185. In another example, the charge delta 189 for the second event 125 is equal to an integral along the Z-coordinate of the collected energy signal 156 between the points 199 and 185. The morphology (e.g., slope, shape) of the collected energy signals 156, 186 are the same, but are vertically displaced with respect to each other. The charge deltas 187, 189 determined based on the integrals of the collected energy signals 156, 186 are equal to each other, and are independent of the locations of the events 125, 117. For example, the delta charges 187, 189 is equal to the integral along the Z-coordinate of the collected energy signals 156, 186 regardless of the locations of the events 125, 117.

The difference between the collected and adjacent energy signals 156, 166 and 186, 188 is equal to zero between the points 181, 199 and the points 183, 199, respectively. Subsequent to the point 199, the difference of the collected and adjacent energy signals 156, 166 and 186, 188 is not equal to zero.

FIGS. 10-14 are graphical representations of the collected and adjacent energy signals measured at the pixelated anodes 114, 116, 118, in accordance with embodiments herein. FIGS. 10-13 illustrate changes in the induced charge on the adjacent pixelated anodes 114, 118 as the negative charge cloud traverses along the Z-coordinate. The pixelated anodes 114, 116, 118 have dimensions W×W when W is half of the thickness "D" of the RPD 100. For example, the aspect ratio of D/W is 0.5.

Figure 10:
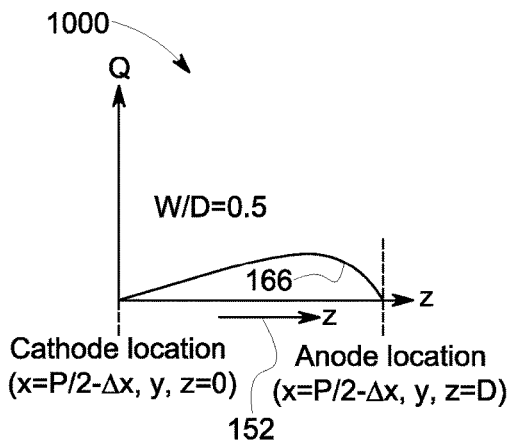
FIG. 10 is a graphical illustration of an embodiment of an adjacent energy signal.

FIG. 10 is a graphical representation 1000 of the adjacent energy signal 166, in accordance with an embodiment. The adjacent energy signal 166 is similar to and/or the same as the adjacent energy signal 166 shown in FIG. 8. The adjacent energy signal 166 represents the induced charge on the pixelated anode 118. The adjacent energy signal 166 is based on the second event 125 (FIG. 4). For example, the adjacent energy signal 166 represents the induced charge as the negative charge cloud traverses along the drift path 147 to the pixelated anode 116 from the cathode 108. The adjacent energy signal 166 extends along the horizontal axis in the direction of the arrow 152 representing the movement of the negative charge cloud. The adjacent energy signal 166 extends from a zero coordinate representing the location of the second event 125 to the width "D" of the RPD 100 along the Z-coordinate.

Figure 11:
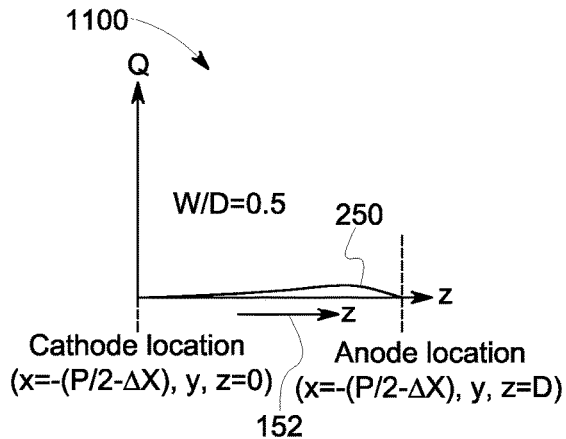
FIG. 11 is a graphical illustration of an embodiment of an adjacent energy signal.

FIG. 11 is a graphical representation 1100 of the adjacent energy signal 250, in accordance with an embodiment. The adjacent energy signal 250 represents the induced charge on the pixelated anode 114. The adjacent energy signal 250 is based on the second event 125 (FIG. 4). For example, the adjacent energy signal 250 represents the induced charge as the negative charge cloud traverses along the drift path 147 to the pixelated anode 116 from the cathode 108. The adjacent energy signal 250 extends along the horizontal axis in the direction of the arrow 152 representing the movement of the negative charge cloud. The adjacent energy signal 250 extends from a zero coordinate representing the location of the second event 125 to the width "D" of the RPD 100 along the Z-coordinate.

The location of the second event 125 is positioned proximate to the pixelated anode 118. For example, the location of the second event 125 along the X-coordinate relative to the center of pixelated anode 116 is at P/2−Δx. The location of the second event 125 along the X-coordinate relative to the center of pixelated anode 116 is at −(P/2−Δx). The second event 125 is located a distance of Δx from the pixelated anode 118, which is remote from the pixelated anode 114 at a distance of P−Δx. Based on the difference in location of the second event 125 relative to the pixelated anodes 114, 118, an induced charge on the adjacent energy signal 166 received from the pixelated anode 118 is greater than the induced charge on the adjacent energy signal 250 received from the pixelated anode 114.

Figure 12:
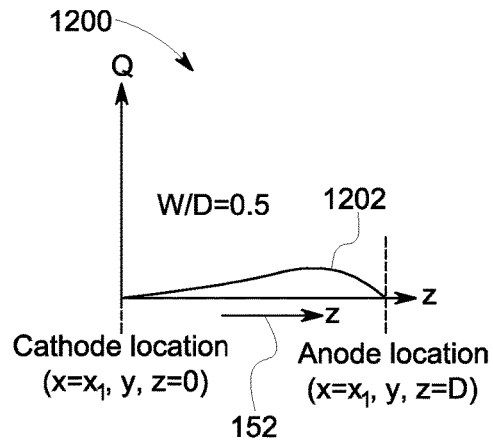
FIG. 12 is a graphical illustration of an embodiment of an adjacent energy signal.
Figure 13:
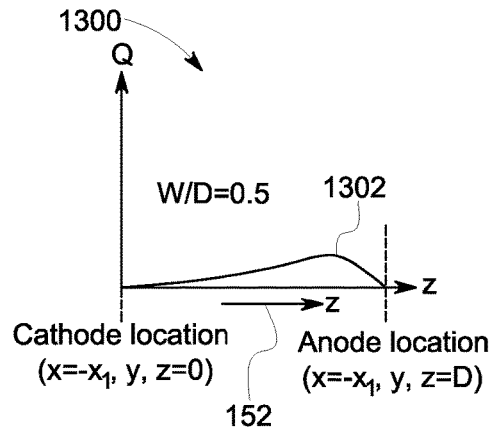
FIG. 13 is a graphical illustration of an embodiment of an adjacent energy signal.

FIG. 12 is a graphical representation 1200 of the adjacent energy signal 1202, in accordance with an embodiment. The adjacent energy signal 1202 represents the induced charge on the pixelated anode 118. The adjacent energy signal 1202 is based on the event 124 (FIG. 4). For example, the adjacent energy signal 1202 represents the induced charge as the negative charge cloud traverses along the drift path 145 to the pixelated anode 116 from the cathode 108. The adjacent energy signal 1202 extends along the horizontal axis in the direction of the arrow 152 representing the movement of the negative charge cloud. The adjacent energy signal 1202 extends from a zero coordinate representing the location of the event 124 to the width "D" of the RPD 100 along the Z-coordinate FIG. 13 is a graphical representation 1300 of the adjacent energy signal 1302, in accordance with an embodiment. The adjacent energy signal 1302 represents the induced charge on the pixelated anode 114. The adjacent energy signal 1302 is based on the event 124 (FIG. 4). For example, the adjacent energy signal 1302 represents the induced charge as the negative charge cloud traverses along the drift path 145 to the pixelated anode 116 from the cathode 108. The adjacent energy signal 1302 extends along the horizontal axis in the direction of the arrow 152 representing the movement of the negative charge cloud. The adjacent energy signal 1302 extends from a zero coordinate representing the location of the event 124 to the width "D" of the RPD 100 along the Z-coordinate The location of the event 124 is positioned along the X-coordinate relative to the center of pixelated anode 116 at X=x1. The location of the event 124 along the X-coordinate relative to the center of pixelated anode 116 is at −x1. For example, the event 124 is located a distance of x1 from the pixelated anode 118, and a distance of −x1 from the pixelated anode 114. When the value of x1 is zero, the induced charges on the adjacent energy signals 1202, 1302 are equal to each other.

Figure 14:
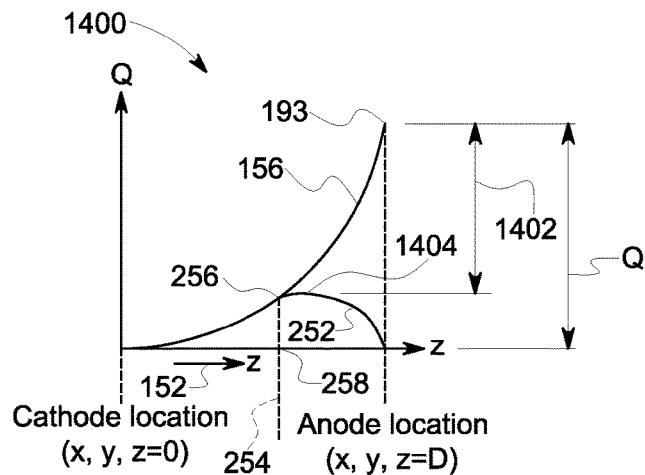
FIG. 14 is a graphical illustration of an embodiment of a collected energy signal and a sum of adjacent energy signals.

FIG. 14 is a graphical representation 1400 of adjacent energy signals 252 and the collected energy signal 156, in accordance with an embodiment. The collected energy signal 156 is similar to and/or the same as the collected energy signal 156 shown in FIGS. 7-8. The adjacent energy signals 252 is a sum of the adjacent energy signals 166, 250 and/or 1202, 1302. For example, as described in Equation 3, a sum of the adjacent energy signals 166, 250 and/or 1202, 1302 is independent along the X and Y-coordinates of the locations of the events 124, 125. The sum of the adjacent energy signals 166, 250 and/or 1202, 1302 is independent on a location (x, y) of the events 124, 125.

As described herein, the collected and adjacent energy signals 156, 252 are independent on the location (x, y) of the events 124, 125. The collected and adjacent energy signals 156, 252 have a dependency along the Z-coordinate, which is represented as a horizontal axis in FIG. 14. A delta charge 1402 is shown between the peak 193 of the collected energy signal 156 and a peak 1404 of the adjacent energy signals 252. As described herein, the delta charge 1402 is independent along the X, Y, and Z-coordinates.

At point 256, represented as at a line 254 along the horizontal axis, a morphology of the collected and adjacent energy signals 156, 252 changes. For example, the collected and adjacent energy signals 156, 252 are identical until a distance 258 along the Z-coordinate. When the negative charge cloud traverses between the cathode 108 and the distance 258, the electrical charge on the pixelated anode 116 is the same and/or similar value as the sum of the adjacent energy signals 252 of the pixelated anodes 114 and 118. For example, the difference ΔV between the collected energy signal 156 and the adjacent energy signals 256 is zero. After the negative charge cloud reaches the distance 258, the morphology of the collected and adjacent energy signals 156, 252 changes. For example, the charge (e.g., along the vertical axis) of the collected energy signal 156 increases. Alternatively, the induced charge of the adjacent energy signals 252 decreases and/or changes polarity.

Figure 14A:
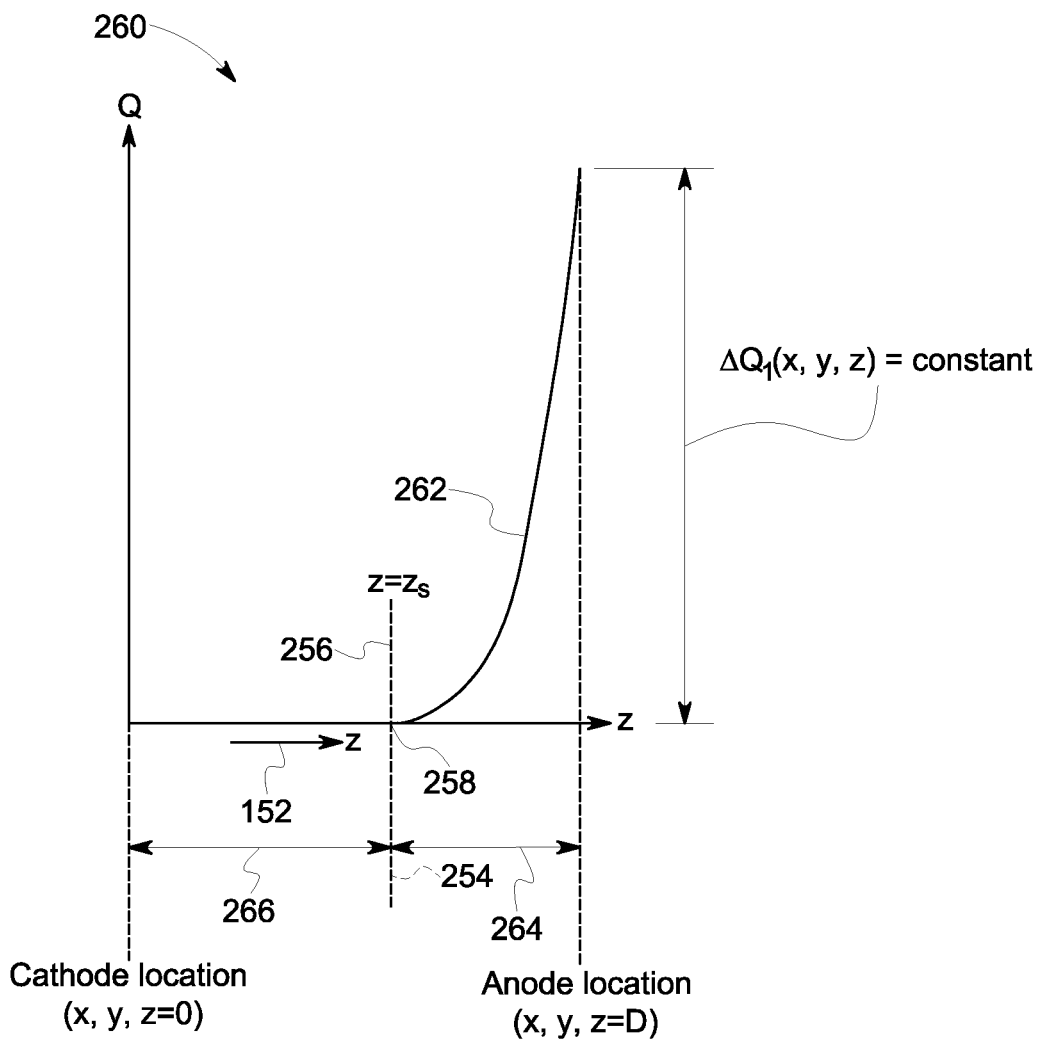
FIG. 14A is a graphical illustration of a delta charge waveform based on the collected energy signal and the sum of adjacent energy signals shown in FIG. 14.

FIG. 14A is a graphical illustration 260 of a delta charge (e.g., $\Delta Q_1$) waveform 262. The delta charge waveform 262 represents a difference between the collected energy signal 156 and the adjacent energy signals 252. The delta charge waveform 262 is divided into two ranges 266, 264 based on a distance from the cathode 108. The range 266 extends along the horizontal axis from the cathode 108 to the distance 258. As shown in FIG. 14, the collected and adjacent energy signals 156, 252 are the same from the cathode 108 to the distance 258. During the range 266, the collected and adjacent energy signals 156, 252 are the same corresponding to the delta charge equal to zero.

The range 264 extends along the horizontal axis from the distance 258 to the pixelated anodes 114, 116, 118 (e.g., at a distance "D" along the Z-coordinate). As shown in FIG. 14, the morphologies of the collected and adjacent energy signals 156, 252 change subsequent to the distance 258 along the horizontal axis. Based on the change in morphologies, the delta charge waveform 262 increases exponentially and/or rapidly in the direction of the arrow 152. As indicated by the delta charge waveform 262, the negative charge cloud contributes to the delta charge after traversing the distance 258. The negative charge cloud continually contributes to the delta charge until reaching the pixelated anode 116 at the distance "D" along the Z-coordinate. For example, the photons corresponding to the events 117, 124, 125 are absorbed in the range 266, by the pixelated anodes 114, 118 as the induced energy charge. The delta charge ($\Delta Q_1$) is constant and is independent on the location of the events 117, 124, 125 (e.g., (x, y, z) coordinates).

The viewing angle of the pixelated anodes 114, 118 of the event 124 weakly depends on the values of the Y-coordinates. Further to reduce the dependency of the viewing angle, on Y-coordinate of the event 124 can be achieved by including additional adjacent pixelated anodes. For example, the sum of the adjacent energy signals may be acquired by summing the adjacent energy signals from all or part of the adjacent pixelated anodes 114, 118, 120, 121, 122, 123, 127, 129 (FIG. 3) that are adjacent to the pixelated anode 116 that includes the event 124. The sum may be determined by the controller circuit 136 as a linear combination of the adjacent energy signals from the pixelated anodes 114, 118, 120, 121, 122, 123, 127, 129 that are directly adjacent to and/or surround the pixelated anode 116.

The sum of the linear combination as mentioned above is less dependent on the X and Y-coordinates of the event 124 within the pixelated anode 116. Additionally or alternatively, a sum of the viewing angles of the pixelated anodes 114, 118, 120, 121, 122, 123, 127, 129 relative to the event 124 is independent on the location (x, y) of the event 124. Based on the additional adjacent pixelated anodes 114, 118, 120, 121, 122, 123, 127, 129, the value of ΔV, previously provided by equation 4, is amended as shown in Equation (4a) below:

$$\Delta V = V_{116} - C \cdot (k_{114} \cdot V_{114} + k_{118} \cdot V_{118} + k_{120} \cdot V_{120} + k_{121} \cdot V_{121} + k_{122} \cdot V_{122} + k_{123} \cdot V_{123} + k_{127} \cdot V_{127} + k_{129} \cdot V_{129}) \quad \text{Equation (4a)}$$

The variable C is the adjusting factor as described in Equation 4. The variables $V_{114}$, $V_{118}$, $V_{120}$, $V_{121}$, $V_{122}$, $V_{123}$, $V_{127}$, $V_{129}$ represent the adjacent energy signals measured by the pixelated anodes 114, 118, 120, 121, 122, 123, 127, 129, respectively. The variable $V_{116}$ represents the collected energy signal measured by the pixelated anode 116. The variables $k_{114}$, $k_{118}$, $k_{120}$, $k_{121}$, $k_{122}$, $k_{123}$, $k_{127}$, $k_{129}$ represent factors configured to adjust the adjacent energy signals of the pixelated anodes 114, 118, 120, 121, 122, 123, 127, 129. For example, the variables $k_{114}$, $k_{118}$, $k_{120}$, $k_{121}$, $k_{122}$, $k_{123}$, $k_{127}$, $k_{129}$ may have a value equal to and/or greater zero determined during calibration of the RPD 100. For a certain range of Z-coordinates of the event 124 in the pixelated anode 116, the value of the difference ΔV given by Equation 4a above may be equal to and/or be adjusted to be equal to zero based on the values of the adjusting factor (e.g., C) and the factors (e.g., $k_{114}$, $k_{118}$, $k_{120}$, $k_{121}$, $k_{122}$, $k_{123}$, $k_{127}$, $k_{129}$). For a range of the Z-coordinates of the event 124 located in the pixelated anode 116, the collected energy signal (e.g., $V_{116}$) and the adjusted sum of the pixelated anodes 114, 118, 120, 121, 122, 123, 127, 129 (e.g., $C \cdot (k_{114} \cdot V_{114} + k_{118} \cdot V_{118} + k_{120} \cdot V_{120} + k_{121} \cdot V_{121} + k_{122} \cdot V_{122} + k_{123} \cdot V_{123} + k_{127} \cdot V_{127} + k_{129} \cdot V_{129})$) have the same value and the same dependency on the Z-coordinates. For example, within the range most of the photons are absorbed in the RPD 100. When the difference is equal to zero (e.g., ΔV=0) in the range along Z-coordinates, the collected energy signal and the adjusted sum of the adjacent energy signals are the same for all the events within the pixelated anode 116. Thereby, all the events within the pixelated anode 116 will produce the same signal ΔV regardless on the location of the event along coordinates (x, y, z).

In reference to FIGS. 15-19, since the delta charge is independent of the coordinates (x, y, z) of the event, the controller circuit 136 utilizes the delta charge to reduce the low energy tail of a spectrum. FIGS. 15-18 are graphical representations of spectrums of measured electrical charges. The spectrums are based on RPD 100 that have been calibrated for gain and offsets using measurements by two isotopes.

Figure 15:
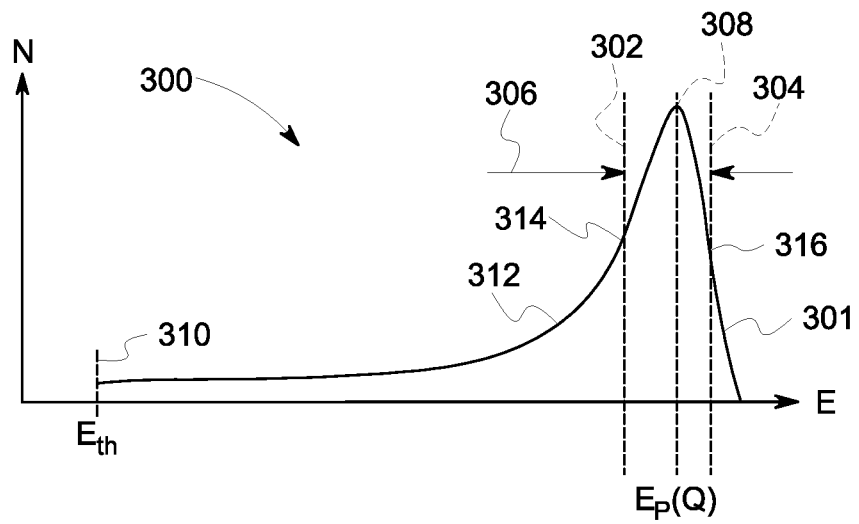
FIG. 15 is a graphical illustration of an embodiment of a spectrum.

FIG. 15 is a graphical illustration 300 of a spectrum 301, in accordance with an embodiment. The spectrum 301 is based on a number of events (e.g., the events 124, 125, 117) acquired from one of the pixelated anodes 110, such as the pixelated anode 116, of the RPD 100. The number of events is shown along the vertical axis. An energy for the number of events is shown along the horizontal axis. For example, the spectrum 301 may represent a combination of collected energy signals for at least one event. The spectrum 301 is not corrected for charge sharing events and/or correction of the low energies tail.

For example, the spectrum 301 may be based on a number of events acquired by the pixelated anode 116. The spectrum 301 includes a peak 308 positioned at an energy value of $E_p(Q)$. The peak 308 represents an energy level for a largest number of events measured by the controller circuit 136. The spectrum 301 includes a low energy tail 312 extending from 310 to an energy at 314. The value of the spectrum 301 at 310 may be based on the predetermined non-zero threshold of the threshold circuit 137. For example, the value of the spectrum 301 at 310 may correspond to charges measured by the controller circuit 136 that are above the predetermined non-zero threshold. The low energy tail is formed by the different locations of the at least one events (e.g., DOI) within the pixelated anode 116.

The spectrum 301 includes a width 306 (e.g., $\Delta E_1$) extending from the energies at 302 to 304 representing a full-width-half-maximum (FWHM) of the spectrum 301. The width 306 may be defined at half of a height of a number of events of the peak 308. For example, the width correspond to half of the number of events of the peak 308. The width 306 may be formed by an electrical noise, which affects the charge measured during the at least one event of the first pixel. The electrical noise may be generated by the RPD 100, the electronic channels 111, and/or the like.

Figure 16:
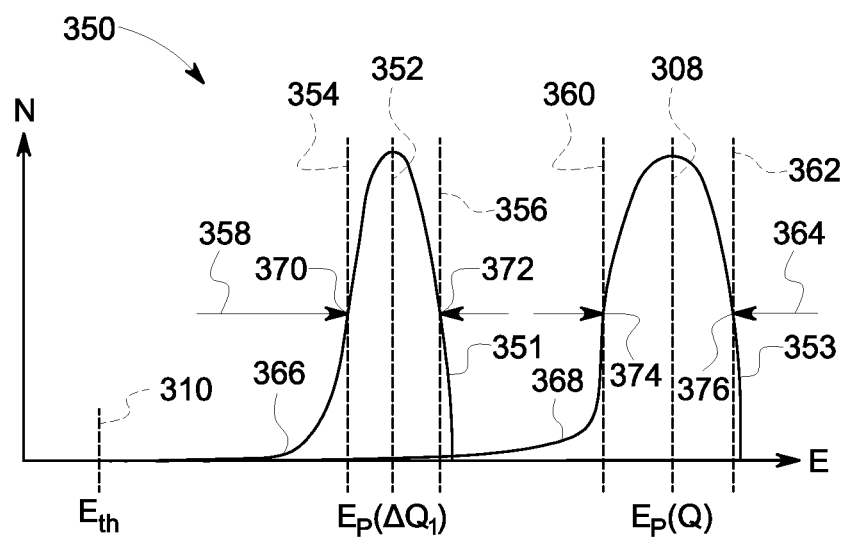
FIG. 16 a graphical illustration of an embodiment of a spectrum and a corrected energy spectrum.

FIG. 16 is a graphical illustration 350 of an embodiment of a spectrum 351 and a corrected energy spectrum 353. The spectrum 351 is based on collected and adjacent energy signals for a plurality of events. The spectrum 351 represents a number of events (plotted along the vertical axis) versus corrected energies along the horizontal axis. The energies of the spectrum 351 are corrected based on Equation 4, represented as $\Delta V$. The $\Delta V$ represents the delta charge of the collected and adjacent energy signals. Equation 4 corrects the energies acquired by the pixelated anodes 114, 116, 118 to be independent of a location (x, y, z) of the acquired events.

For example, the collected energy signals are acquired by the pixelated anode 116. The controller circuit 136 calculates a sum of the adjacent energy signals for the adjacent pixelated anodes 114, 118. The controller circuit 136 multiplies the sum of the adjacent energy signals by the adjusting factor (e.g., C), and subtracts the value from the collected energy signal of the pixelated anode 116 to determine $\Delta V$. $\Delta V$ represents a voltage signal corresponding to the corrected energies of the spectrum 351. For example, V represents a difference in the signals measured by the P&H circuit 200 (FIG. 6) of the electronic channels 111 between the collected energy signal of the pixelated anode 116 and the sum of the adjacent energy signals of the pixelated anodes 114, 118. The corrected energies of the spectrum 351 is independent of the locations (x, y, z) of the events acquired by the pixelated anode 116.

The spectrum 351 is independent on the location of the events along the Z-coordinate (e.g., DOI) and along the X and Y-coordinates. Based on the corrected energy of the spectrum 351, the spectrum 351 includes a reduced low energy tail 366. The low energy tail 366 is smaller relative to the low energy tail 312 of FIG. 15. For example, the low energy tail 366 ranges from 310 to a line 354 of the spectrum 351. The corrected energies of the spectrum 351 include values of the adjacent energy signals (e.g., induced charge measured at the pixelated anodes 114, 118). For example, the threshold circuit 137 (FIG. 6) of the electronic channel 111 is configured to have a pre-determined non-zero threshold that allows the induced charge measured by the pixelated anodes 114, 118 to be included.

The spectrum 351 includes a peak 352. The peak 352 corresponds to a corrected energy having a largest number of events. The peak 352 represents the delta charge (e.g., $\Delta Q$) between the peak value 213 of the collected and adjacent energy signals outputted by the P&H circuit 200 of electronic channels 111 (FIG. 5). The spectrum 351 has a width 358 (e.g., $\Delta E'_2$) from the energies 370 to 372. The width 358 represents a FWHM of the spectrum 351. The width 358 is produced by the noise of the RPD 100, the noise of the electronic channel 111, and/or the like. The width 358 is wider than the width 306 of the spectrum 301. For example, the spectrum 351 is based on more than one pixelated anode 114, 116, 118. As described above, the width 358 is based on an amount of noise provided by each of the pixelated anodes 114, 116, 118. Since the spectrum 351 is based on three pixelated anodes 114, 116, 118, which is two more pixelated anodes than the single pixelated anode 116 of the spectrum 301. Accordingly, the noise associated with the spectrum 351 is represented as a factor equal to √3 as provided in Equation 5.

$$\Delta E'_2 = \sqrt{3} \cdot \Delta E_1 \qquad \text{Equation (5)}$$

The variable $\Delta E'_2$ represents the width 358 of the spectrum 351. The variable $\Delta E_1$ represents the width 306 of the spectrum 301. The width 306 is multiplied by a square root of a number of pixelated anodes 110 of the spectrum 351. For example, the spectrum 351 is based on three pixelated anodes, the pixelated anodes 114, 116, 118.

The peak 352 of the spectrum 351 is positioned at an energy value of $E_p(\Delta Q_1)$. The peak 352 should be shift and/or calibrated to show the real energy, for example at the energy value $E_p(Q)$ of the peak 308. As described herein, the spectrum 351 is based on a calibration, which offsets the energy value. The peak 352 is shifted such that the calibration is equal to zero. The controller circuit 136 shifts the peak 352 of the spectrum 351 to a corrected energy. The shifting by the controller circuit 136 is done by multiplying the spectrum 351 by a factor K as shown in Equation 6.

$$K = \frac{Q}{\Delta Q} \qquad \text{Equation (6)}$$

The coefficient K represents a ratio. The controller circuit 136 determines the ratio based on the peak 308 of the spectrum 301 and the peak 352 of the delta-charge spectrum 351. The ratio is configured to adjust a gain and/or position of the peak 352 of the spectrum 351. The ratio, shown as the coefficient K, is determined based on Equation 6. The variable Q represents the peak 308 of the spectrum 301. For example, Q represents the correct energy of the absorbed photons. The variable $\Delta Q$ represents the delta charge associated with the peak 352 of the spectrum 351. Optionally, the value of the ratio may be adjusted according to the adjustment for the adjustment factor (e.g., C)

The controller circuit 136 adjusts the spectrum 351 by multiplying the spectrum 351 by the ratio (e.g., K) to form the corrected spectrum 353. The adjustment to the spectrum 351 by the controller circuit 136 stretches and/or shifts the spectrum 351. For example, stretching and/or shifting the spectrum 351 by the ratio (e.g., K) to have the corrected spectrum 353 at the peak 308. The adjustment to the spectrum 351 further stretches the width 358 to a width 364 (e.g., $\Delta E_2$) by the ratio. The corrected energy spectrum 353 has a width 364 between points 374 and 376 (e.g., between lines 360 and 362), which is at half of the height of the peak 308. The width 364 of the corrected energy spectrum 353 is wider than the spectrum 351. The width 364 of the corrected spectrum 353 is determined by the controller circuit 136 based on Equation 7.

$$\Delta E_2 = K \cdot \Delta E'_2 = K \cdot \sqrt{3} \cdot \Delta E_1 \qquad \text{Equation (7)}$$

The corrected energy spectrum 353 includes a low energy tail 368. The low energy tail 368 is formed by the stretching of the low energy tail 366 of the spectrum 351. Based on the stretching of the low energy tail 366 by the ratio, the low energy tail 368 is wider than the low energy tail 366. It may be noted that the low energy tail 366 is lower than the low energy tail 312 of the spectrum 301 (FIG. 15).

Optionally, the controller circuit 136 may calculate an energy resolution. The energy resolution (e.g., ER) represented as a percentage determined based on Equation 8.

$$ER = \frac{\Delta E}{E_P} \cdot 100 \qquad \text{Equation (8)}$$

The variable ΔE represents the width 306, 364 (e.g., FWHM) of the spectrum. The value $E_P$ represents the peak 308. For example, the energy resolution of the spectrum 301 (FIG. 15) is 4%. In another example, the ratio (e.g., K) is determined by the controller circuit 136 to be 1.3. The energy resolution of the corrected spectrum 353 is 9%. Based on the correction for the low energy tail 312, the energy resolution is increased for the corrected energy spectrum 353.

The corrected energy spectrum 353 is derived by the controller circuit 136 applying the correction method described herein (e.g., by applying the ratio).

Figure 17:
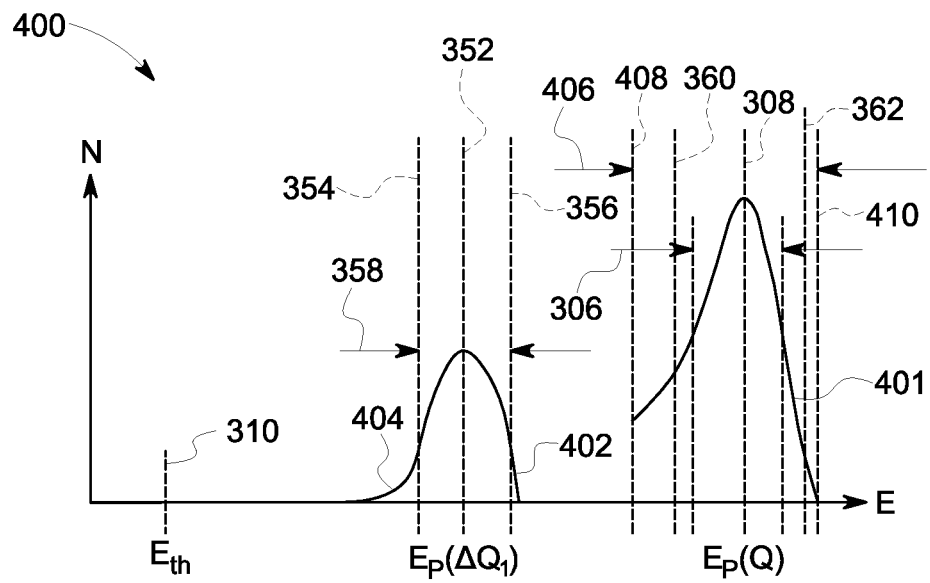
FIG. 17 is a graphical illustration of an embodiment of a first and second spectrum.
Figure 18:
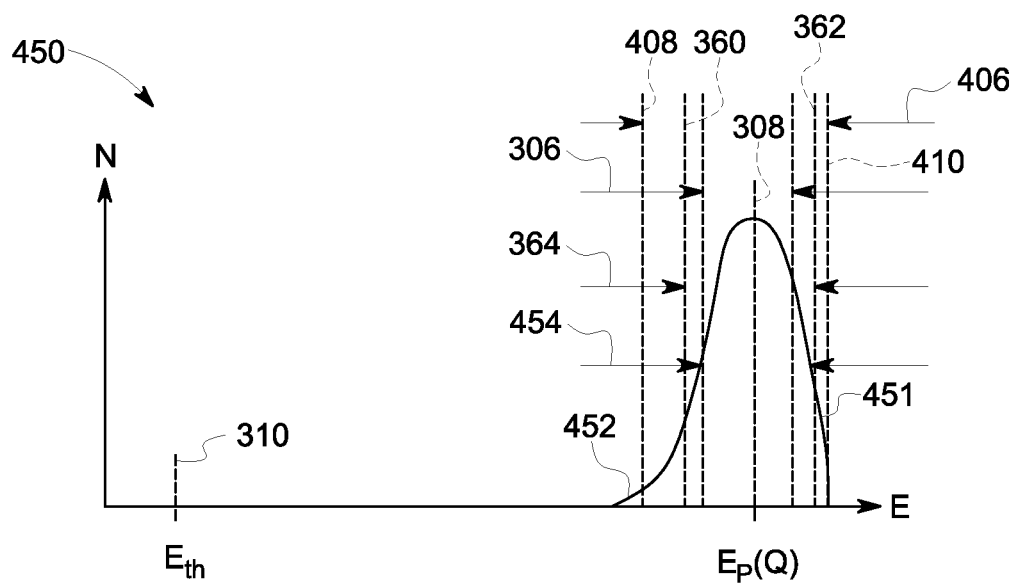
FIG. 18 is a graphical illustration of an embodiment of a corrected energy spectrum.

Additionally or alternatively, to reduce the degradation in the energy resolution caused by the correction method, the controller circuit 136 may apply a correction as shown in FIGS. 17-18. For example, the controller circuit 136 does not apply a correction to events of spectrum 301, which are already within a predetermined energy window (e.g., $\Delta E_{Window}$). The energy window representing a predetermined energy range for medical imaging.

FIG. 17 is a graphical illustration 400 of a first spectrum 401 and a second spectrum 402, according to an embodiment. The first spectrum 401 represents a portion of the collected energy signals within the energy window 406 (e.g., $\Delta E_{Window}$). The energy window 406 extends from lines 408 and 410. The first spectrum 401 may be a portion of the spectrum 301 (FIG. 15) within the energy window 406. For example, the first spectrum 401 is based on the collected energy signal. The portions of the spectrum 301 outside the energy window 406 are cut-off and/or removed by the controller circuit 136 to form the first spectrum 401. The first spectrum 401 can have similar characteristics with the spectrum 301. For example, the first spectrum 401 includes all the events of the spectrum 301 that are within the energy window 406. The first spectrum 401 may have a FWHM corresponding to the width 306 similar to and/or the same as the spectrum 301. The first spectrum 401 has the peak 308 at the energy level at $E_p(Q)$ similar to and/or the same as the spectrum 301.

The events in the low energies tail 312 of the spectrum 301, which is outside the energy window 406 are corrected. For example, the controller circuit 136 corrects the energies based on Equation 4, represented as ΔV. The ΔV represents the delta charge of the collected energy signal from the pixelated anode 116 and the sum of the adjacent energy signals from adjacent pixelated anodes 114 and 118. Equation 4 corrects the energies acquired by the pixelated anode 110, such as the pixelated anode 116, to be independent of a location (x, y, z) of the acquired events. The controller circuit 136 selects a portion of the collected energy signal and a portion of the adjacent energy signals that are outside the energy window 406.

For example, the controller circuit 136 selects a portion of the collected energy signals acquired by the pixelated anode 116 that are outside the energy window 406. The controller circuit 136 calculates a sum of the adjacent energy signals for the adjacent pixelated anodes 114, 118 that are outside the energy window 406. The controller circuit 136 multiplies the sum of the adjacent energy signals by the adjusting factor (e.g., C), and subtracts the value from the collected energy signal of the pixelated anode 116 to determine ΔV. ΔV represents a voltage signal corresponding to the corrected energies of the energy tail 312 of the spectrum 301. For example, ΔV represents a difference in the peak values 213 measured by the P&H circuit 200 (FIG. 6) of the electronic channels 111 between the pixelated anodes 114, 116, 118. The corrected energies are independent of the locations (x, y, z) of the events acquired by the pixelated anode 116.

The values of the ΔV forms the second spectrum 402. The second spectrum 402 is similar to the spectrum 351 (FIG. 16), but includes less events. For example, the spectrum 351 includes all of the events in the spectrum 301, and the second spectrum 402 includes the events that are outside of the energy window 406. For example, the second spectrum 402 includes only the events that are outside of the energy window 406. Based on a lower number events, a peak of the second spectrum 402 is different. For example, the peak of the second spectrum 402 has a lower amplitude than the peak 352 of the spectrum 351. Although, the peak of the second spectrum 402 is at the same position as the peak 352 of the spectrum 351. The second spectrum 402 has the same and/or similar width 358 (e.g., $\Delta E'_2$) as the spectrum 351 between lines 354 and 356.

The second spectrum 402 includes a low energy tail 404. The low energy tail 404 has a lower amplitude than the low energy tail 312 of the spectrum 301. The peak of the second spectrum 402 is positioned at an energy value of $E_p(\Delta Q_1)$. The controller circuit 136 shifts and/or combines the second spectrum 402 with the first spectrum 401. As described herein, the second spectrum 402 is based on the corrected values of the ΔV. The peak of the second spectrum 402 is shifted such that it is aligned with the peak 308 of the spectrum 401. The controller circuit 136 shifts/stretches and/or combines the second spectrum 402 with the first spectrum 401. The shifting/stretching by the controller circuit 136 is done by multiplying the second spectrum 402 by the ratio (e.g., K) as shown in Equation 6, which is equivalent to the charge ratio of peak 308 and peak 352.

Optionally, the controller circuit 136 determines the ratio based on the peak 308 of the spectrum 301 and the delta charge. The ratio is configured to adjust a gain and/or position of the peak of the second spectrum 402. The controller circuit 136 adjusts the second spectrum 402 by multiplying the second spectrum 402 by the ratio (e.g., K). The adjustment to the second spectrum 402 by the controller circuit 136 stretches and/or shifts the second spectrum 402. For example, the stretching and/or shifting of the second spectrum 402 by the ratio (e.g., K) and combine with the first spectrum 401. The combination of the shifted/stretched second spectrum 402 and the first spectrum 401 forms a corrected energy spectrum 451 shown in FIG. 18, which has reduced low energies tail.

FIG. 18 is a graphical illustration 450 of an embodiment of the corrected energy spectrum 451. The corrected energy spectrum 451 represents a combination of the first and second spectrums 401, 402. For example, the corrected energy spectrum 451 is corrected for a low energy tail for events outside the energy window 406 (e.g., between 408 and 410). The corrected energy spectrum 451 has a width 454 (e.g., $\Delta E_3$) and the peak 308 representing the energy absorbed by the photons. The width 454 of the corrected energy spectrum 451 is wider than the width 306 of the spectrum 301 (FIG. 15). For example, the relationship between the widths 306 (e.g., $\Delta E_1$), 364 (e.g., $\Delta E_2$), 454 (e.g., $\Delta E_3$) are shown in Equation 9.

$$\Delta E_2 > \Delta E_3 > \Delta E_1 \qquad \text{Equation (9)}$$

The corrected energy spectrum 451 includes a low energy tail 452 outside the energy window 406. It may be noted that the low energy tail 452 is lower and/or reduced relative to the low energy tail 312.

The low energy tail 312 of the spectrum 301 is produced mainly by the dependency on the DOI of the measured signals produced on the pixelated anodes 110, and by the charge sharing events. Typically, about 60% of the events of the spectrum 301 are within the energy window 406, 10% are charge sharing events, and 30% are events that depends on the DOI. The corrected spectrum 451 is the sum of the first and second spectrums 401, 402. The peaks of the first and second spectrums 401, 402 have differences in amplitudes at a ratio of 60/30, respectively.

The corrected energy spectrum 451 is configured to have a higher energy resolution relative to the spectrum 353. The energy resolution is determined by the controller circuit 136 based on Equation 8. For example, the energy resolution of the corrected spectrum 353 is 9%. The energy resolution of the corrected spectrum 451 is 5.15% with a reduced low energy tail 452.

Figure 19:
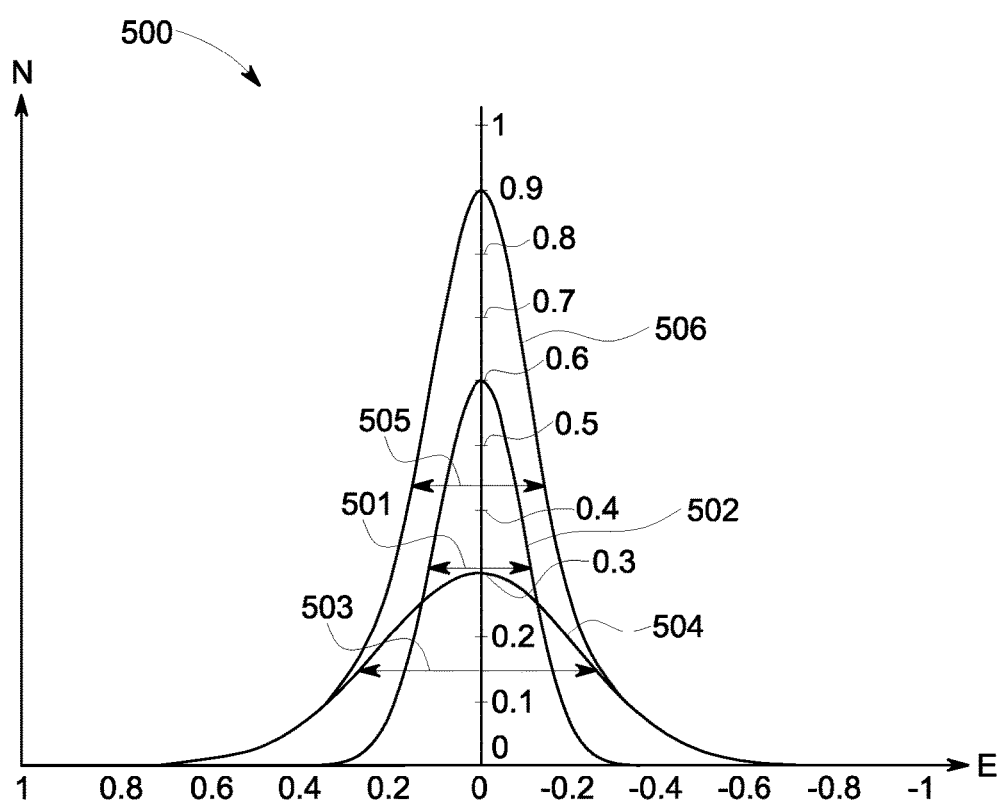
FIG. 19 is a graphical illustration of an embodiment of Gaussian curves representing a corrected energy spectrum.

FIG. 19 is a graphical illustration 500 of an embodiment of Gaussian curves 502, 504, 506 representing spectra 401, 402 and the corrected energy spectrum 451 of FIGS. 17 and 18, respectively. The graphical illustration 500 includes two Gaussian curves 502, 504 that are added together to produce the Gaussian curve 506. For example, the Gaussian curves 502, 504 are represent the first and second spectrums 401, 402, respectively. The Gaussian curves 502, 504, 506 include widths 501, 503, 505. The widths 501, 503, 505 are related to each other by the ratio 4, 9, 5.15, respectively. The widths 501, 503, 505 are indicative of the widths 306, 358, 454 of the spectrums 401, 402, 451, respectively. The corrected spectrum 451 is the combination of the first and second spectrums 401, 402. The corrected spectrum 451 includes a reduced low energy tail 452 relative to the low energy tail 312 (FIG. 15). A reduction in the low energy tail 452 includes a minor degradation in the energy resolution from 4% to 5.15%.

In connection with the charge sharing events, the low energy tails can be created by the charge sharing events. The charge sharing events correspond to an electrical charge of an event is spilt between two adjacent pixelated anodes 110. The electrical charge on the pixelated anodes 110 depend on the location of the event.

To reduce the low energy tail, a correction can be applied by the controller circuit 136 for the correction of the charge sharing event and the correction for the dependency of the measured signals in the pixelated anodes 110 on the DOI (e.g., location of the event). The controller circuit 136 is configured to distinguish between a charge sharing events and events that the charge induced depends on the DOI.

For charge sharing events, a part of the electrical charge of the event is shared between two pixelated anodes 110. For example, between the pixelated anode 116 and one of the adjacent pixelated anodes 114 or 118. A sum of the adjacent energy signals of the adjacent pixelated anode 114, 118 is similar in its value to the charge of the collected energy signal prior to the splitting of its charge between two adjacent pixelated anodes 110. The controller circuit 136 determines the charge sharing event when the sum of the signals collected from two pixelated anodes 110 is within a predetermined range around the value of the electrical charge produced by absorption of a photon in the RPD 100. The controller circuit 136 identifies the events for the adjacent pixelated anodes 110 as the charge sharing event. The charge sharing event is counted by the controller circuit 136 as one event belonging to one of the adjacent pixelated anodes 110.

For example, the correction for charge sharing events by the controller circuit 136 to recover the electrical charge of the event is done by adding the signals from the two adjacent pixelated anodes 110 that the event is split. Additional discussion regarding sub-pixels may be found, for example, in U.S. patent application Ser. No. 14/627,436, entitled "Systems and Methods for Improving Energy Resolution by Sub-Pixel Energy Calibration," filed 20 Feb. 2015, and U.S. patent application Ser. No. 15/280,640, entitled "Systems and Methods for Sub-Pixel Location Determination," filed 29 Sep. 2016, which are hereby incorporated by reference in their entirety.

A width of a spectrum corrected for charge sharing events is wider than the width 306 of the spectrum 301. The width 306 of the spectrum 301 is derived from the measurement of the pixelated anode 116. The width of the charge sharing event is broadened by the noise of two adjacent pixelated anodes 110. The noise is generated by the RPD 100, the electronic channel 111 coupled to the adjacent pixels 110, and/or the like. A spectrum corrected for charge sharing events, is determined by the controller circuit 136 by adding the events from the two adjacent anodes 110. Accordingly, the width of a spectrum corrected for charge sharing is calculated according to Equation 10.

$$\Delta E = \sqrt{2} \cdot \Delta E_1 \qquad \text{Equation (10)}$$

The variable $\Delta E_1$ represents the width 306 of the spectrum 301. The broadening of the width 306 is represented by the factor of $\sqrt{2}$ and stands only for the events corrected for charge sharing events. It may be noted that not all the events in the spectrum 301 are corrected for charge sharing events, the width 306 of spectrum 301 will be broaden by a factor that is smaller than $\sqrt{2}$. The factor represents the noise of two pixelated anodes 110 (e.g., the pixelated anode 116, one of the adjacent pixelated anode 114, 118) of the RPD 100, the noise associated with the electronic channels 111, and/or the like. The noise associated with the spectrum of a charge sharing event corrected is higher than the noise associated with the spectrum 301.

The events corrected for either charge sharing and/or dependency on the location of the events (e.g., DOI) produces a wider spectrum. The wider spectrum degrades the energy resolution of the RPD 100. In connection with FIGS. 17-18, the controller circuit 136 is configured to reduce the overall degradation of the energy resolution. For example, by correcting the spectrum for events having energies that are outside the energy window (e.g., the energy window 406), which are in the range of the low energies tail to be corrected.

The remaining events outside the energy window, which are not charge sharing events are identified by the controller circuit 136 as an event that the electrical charge depends on the DOI. The correction for the dependency of the events on the DOI was discussed above.

Figure 20:
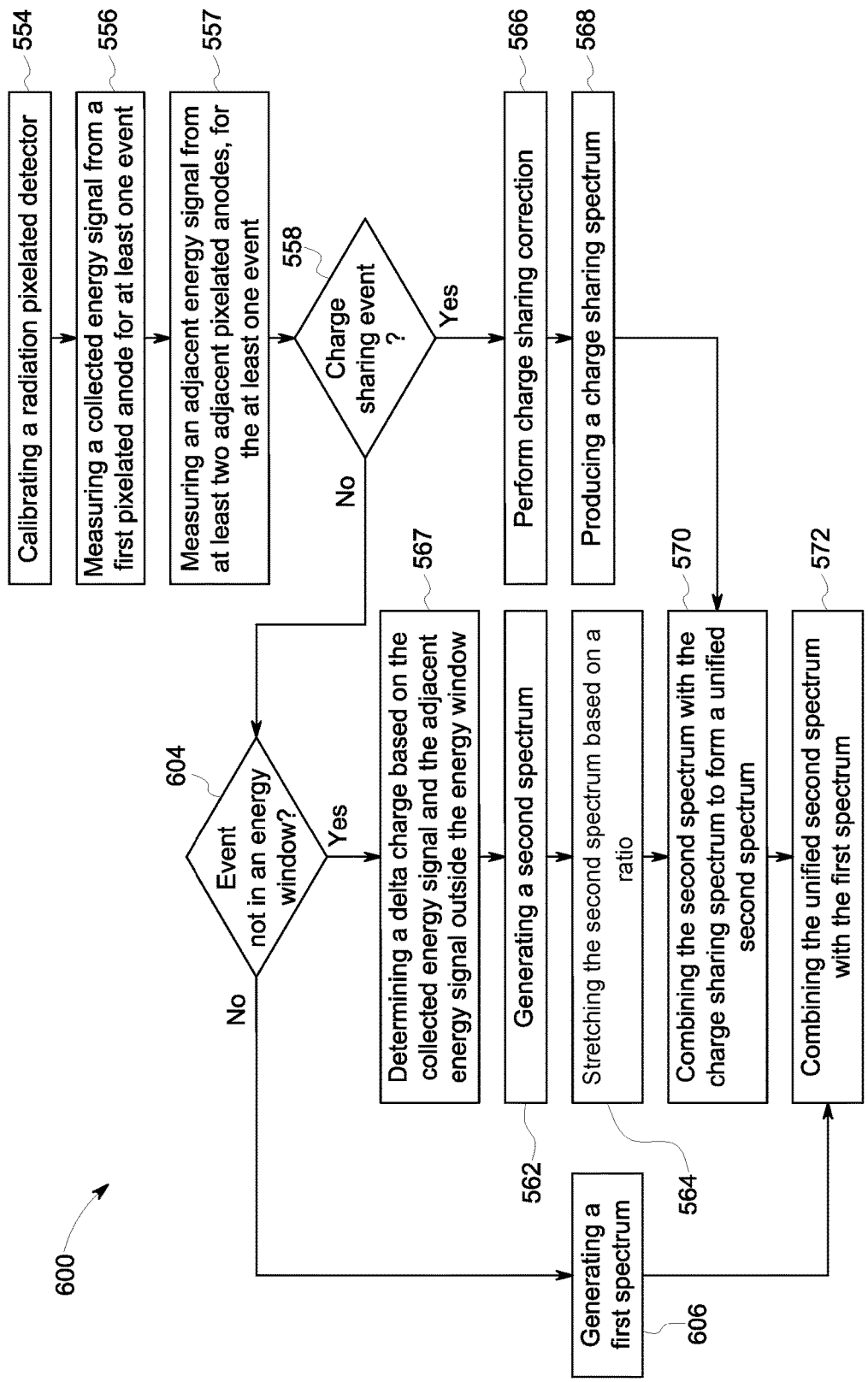
FIG. 20 is a flow chart of a method for reducing a low energy tail in an energy spectrum.

FIG. 20 is a flow chart of a method 600 for reducing a low energy tail in an energy spectrum. The method 600, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be used as one or more algorithms to direct hardware to perform one or more operations described herein.

Beginning at 554, the controller circuit 136 calibrates the RPD 100. For example, the calibration of the RPD 100 adjusts a gain and offset. The calibration by the controller circuit 136 includes measuring a spectrum of a collected energy signal for two known energies corresponding to two known isotopes. Based on the spectrum, the controller circuit 136 determines a calibrated spectrum for the collected energy signals.

Optionally, during the calibration the controller circuit 136 may determine the adjusting factor (e.g., C) for Equation 4. The adjusting factor is configured to define Equation 4 such that $\Delta V$ is equal to zero in the range between z=0 and coordinate the distance 258 (FIG. 14) and is not equal to zero when the adjacent energy signal 252 and the collected energy signal 156 separate in the range between Z-coordinates between the distance 258 and "D." For example, the adjusting factor defines the value of $\Delta V$ to not be zero when the collected energy signal 156 and the adjacent energy signal 252 correspond to a value subsequent to 258 along the horizontal axis of FIG. 14. The adjusting factor may be determined by the controller circuit 136 based on morphologies (e.g., slope, peaks, overall shape) of the adjacent energy signal 250 and the collected energy signal 156. For example, the controller circuit 136 may determine when the slopes of the collected energy signal 156 and the adjacent energy signal 250 are different and/or diverge during the calibration. The slopes of the collected and adjacent energy signals 156, 250 diverge at the distance 258 along the horizontal axis. Based on a position at the distance 258, the controller circuit 136 may determine the adjusting factor.

At 556, the controller circuit 136 measures a collected energy signal from a first pixelated anode 110, for at least one event. For example, for each event (e.g., the event 124, the second event 125, the third event 117) the controller circuit 136 measures the collected energy signal 156 (FIG. 14) from the pixelated anode 116 absorbing the photon 141.

At 557, the controller circuit 136 measures an adjacent energy signal from at least two adjacent pixelated anodes 110, for at least one event. The at least two adjacent pixelated anodes 110 are aligned either along the X and/or Y-coordinate or on both sides of the first pixel and located symmetrically relative to the first pixelated anode. For example, the event 124 (FIG. 3) is located within the pixelated anode 116. The at least two adjacent pixelated anodes 110 can include the pixelated anodes 114, 118 both along the X-coordinate and/or the pixelated anodes 120, 122 along the Y-coordinate relative to the pixelated anodes 116. Additionally or alternatively, the adjacent energy signal may include one or more of the pixelated anodes 114, 118, 120, 121, 122, 123, 127, 129 as described in Equation 4a. The adjacent energy signal represents the induced charge on the at least two adjacent pixelated anodes as the negative charge cloud traverses to the pixelated anode 116.

At 558, the controller circuit determines if the least one event is the charge sharing event. The controller circuit 136 can determine a charge sharing event by comparing the collected energy signal (e.g., of the pixelated anode 116) with the adjacent energy signal (e.g., of the pixelated anode 114, 118, 120, 122) during the at least one event. When the event is located at the line 144 (FIG. 4) the collected energy signal and the adjacent energy signal for both of the adjacent pixelated anodes are similar and/or the same within a predetermine non-zero threshold. For example, the at least one event is located at the line 144. The controller circuit 136 measures the collected energy signal of the pixelated anode 116 and the adjacent energy signal of the pixelated anode 118. The controller circuit 136 may compare the collected energy signal and the adjacent energy signal. If a difference between the collected energy signal and the adjacent energy signal is within a predetermine non-zero threshold, the controller circuit 136 may determine that the event corresponds to a charge sharing event.

It may be noted that the charge sharing event positioned on the line 144 may be a specific example, the general criteria to distinguish between charge sharing event and induced adjacent signals can be based on the Equation 3. For example, the sum of the adjacent signals from the adjacent pixelated anodes located symmetrically on both side of the pixelated anode having the event is equal to $2V_0$. Accordingly, for events when the sum is not equal to $2V_0$, the controller circuit 136 may determine the event is a charge sharing event.

If the at least one event is the charge sharing event, then at 566, the controller circuit 136 performs a charge sharing correction. The controller circuit 136 adjusts the collected energy signal to include a portion of the adjacent energy signal representing a charge sharing pixelated anode. For example, the charge sharing event is located at the line 144 (FIG. 4). The electrical charge of the charge sharing event is split between the pixelated anodes 116 and the pixelated anode 118 (e.g., the charge sharing pixelated anode). The collected energy signal measured at the pixelated anode 116 is adjusted based on the portion of the adjacent energy signal of the pixelated anode 118. For example, a charge of the collected energy signal is increases to include the charge of the adjacent energy signal for the charge sharing event.

At 568, the controller circuit 136 produces and/or generates a charge sharing spectrum. For example, the controller circuit 136 produces a spectrum of the number of charge sharing event versus the energy of the events corrected for charge sharing. The spectrum may have a peak energy at $E_p(Q)$ as shown in FIGS. 15-18.

At 604, the controller circuit 136 determines if the at least one event is not within the energy window 406. For example, if the controller circuit 136 compares the electrical charge of the collected energy signal of the pixelated anode 116. If the electrical charge is outside the energy window 406 (e.g., below the line 408), the controller circuit 136 determines that the event is not within the energy window 406.

If the at least one event is within the energy window 406, at 606, the controller circuit 136 determines the first spectrum 401 (FIG. 17). For example, the first spectrum 401 represents a number of events (e.g., along the vertical axis) versus the energy of the events (e.g., along horizontal axis). The first spectrum 401 includes the peak 308 at the energy value of $E_p(Q)$.

If the at least one event is not within the energy window 406, at 567, the controller circuit 136 determines a delta charge based on the collected energy signal and the adjacent energy signal outside the energy window 406. For example, the controller circuit 136 subtracts the electrical charge of the collected energy signal as described in Equation 4. The controller circuit 136 sums the electrical charge of the adjacent energy values of the at least two adjacent pixelated anodes. The controller circuit 136 multiplies the sum by the adjusting factor (e.g., C), and subtracts from the collected energy signal.

At 562, the controller circuit 136 generates the second spectrum 402 (FIG. 17). The second spectrum 402 represents a number of event (e.g., along the vertical axis) versus the corresponding event energies (e.g., along the horizontal axis). The event energies are based on a portion of the collected and adjacent energy signals outside the event window 406.

At 564, the controller circuit 136 stretches the second spectrum 402 based on the ratio (e.g., K). For example, the controller circuit 136 multiplies the second spectrum 402 by the ratio determined in Equation 6. The ratio is determined by the controller circuit 136 based on the peak 308 of the first spectrum 401, and the peak 352 (e.g., at $E_p(\Delta Q_1)$) of the second spectrum 402 (e.g., represents the delta charge). The stretching of the second spectrum 402 shifts or moves the peak 352 of the second spectrum 402 to the peak 308 (e.g., $E_p(Q)$).

At 570, the controller circuit 136 combines the second spectrum 402 with the charge sharing spectrum to form a unified second spectrum. For example, the unified second spectrum includes the number of events of the charge sharing spectrum and the second spectrum 402.

At 572, the controller circuit 136 combines the unified second spectrum with the first spectrum 401. For example, the controller circuit 136 combines the number of events of the unified second spectrum with the first spectrum 401. The unified second spectrum includes the corrected energies of the events having charge sharing events and/or that are dependent on a location of the at least one event (e.g., dependent on the DOI). The combination of the unified second spectrum and the first spectrum 401 produces a corrected energy spectrum (e.g., the corrected energy spectrum 451 of FIG. 18).

Figure 21:
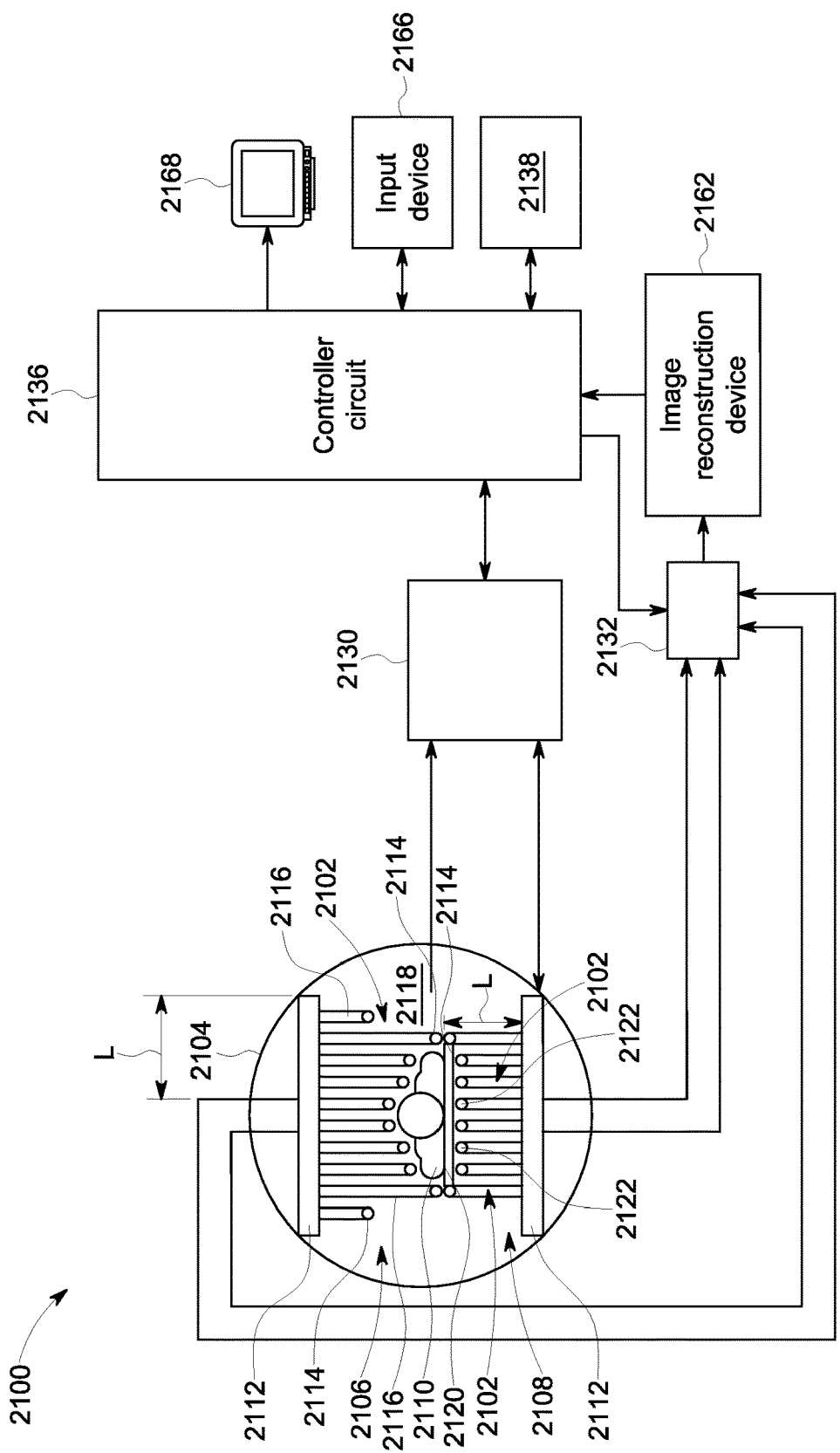
FIG. 21 is a schematic block diagram of an embodiment of a medical imaging system.

FIG. 21 is a schematic block diagram of an embodiment of a medical imaging system 2100, in accordance with an embodiment. For example, the medical imaging system 2100 is shown as a nuclear medicine (NM) imaging system. Optionally, the medical imaging system 2100 may be a PET, SPECT, MBI, and/or the like.

The medical imaging system 2100 includes a plurality of imaging detectors 2102 mounted to a gantry 2104. The imaging detectors 2102 are configured as two separate detector arrays 2106 and 2108 coupled to the gantry 2104 above and below a subject 2110 (e.g., a patient). The detector arrays 2106 and 108 may be coupled directly to the gantry 2104, or may be coupled via support members 2112 to the gantry 2104 to allow movement of the entire arrays 2106 and/or 2108 relative to the gantry 2104 (e.g., translating movement in the left or right direction as viewed in FIG. 21). Additionally, each of the imaging detectors 2102 includes a detector unit 2114 mounted to a movable detector carrier 2116 (e.g., a support arm or actuator that may be driven by a motor to cause movement thereof) that extends from the gantry 2104. In some embodiments, the detector carriers 2116 allow movement of the detector units 2114 towards and away from the subject 2110, such as linearly and in parallel to each other. The imaging detectors 2102 may include one or more detector units 2114 coupled to a respective detector carrier 2116 and having dimensions of 4 cm to 20 cm and may be formed of tiles and/or modules of Cadmium Zinc Telluride (CZT), CdMnTe (CMT), HgI, Si, GaAr, Si, Ge and/or the like.

The gantry 2104 may be formed with an aperture 2118 (e.g., opening or bore) therethrough as illustrated. A patient table 2120 is configured with a support mechanism (not shown) to support and carry the subject 2110 in one or more of a plurality of viewing positions within the aperture 2118 and relative to the imaging detectors 2102. The gantry 2104 may also be configured in other shapes (e.g., "C", "H" and "L"), and may be rotatable about the subject 2110.

Each of the imaging detectors 2102 have a radiation pixelated detector, which is directed towards the subject 2110 or a region of interest within the subject. The radiation pixelated detector may include one or more collimators 2122. The field of view for each of the imaging detectors 2102 may be increased, decreased, or relatively unchanged by the type of collimator 2122. In one embodiment, the collimator 2122 is a multi-bore collimator, such as a parallel hole collimator. However, other types of collimators, such as converging or diverging collimators may optionally or alternatively be used. Other examples for the collimator 2122 include pinhole, parallel-beam converging, diverging fan-beam, converging or diverging cone-beam, multi-bore converging, multi-bore converging fan-beam, multi-bore converging cone-beam, multi-bore diverging, or other types of collimator. In some embodiments, at least two types of collimators are used. Optionally, multi-bore collimators may be constructed to be registered with pixels of the detector units 2114.

The medical imaging system 2100 includes a controller unit 2130. The controller unit 2130 is configured to control a movement and positioning of the patient table 2120, the imaging detectors 2102, the gantry 2104, the collimators 2122, and/or the like. A range of motion before or during an acquisition, or between different image acquisitions, is set to maintain the actual field of view (FOV) of each of the imaging detectors 2102. The controller unit 2130 may include a gantry motor controller, a table controller, a detector controller, a pivot controller, a collimator controller, and/or the like. For example, the controllers may be automatically commanded by a controller circuit 2136, manually controlled by an operator, or a combination thereof.

The imaging detectors 2102 may be positioned to image a portion of the subject 2110 based on events detected the controller circuit 2136. Positioning may be accomplished manually by the operator and/or automatically. After the imaging detectors 2102, gantry 2104, patient table 2120, and/or collimators 2122 are positioned by the controller unit 2130, one or more images are acquired by one or more of the imaging detectors 2102 being used. The image data acquired by the imaging detectors 2102 may be combined and reconstructed into a composite image, which may comprise two-dimensional (2D) images, a three-dimensional (3D) volume or a 3D volume over time (4D).

In various embodiments, a readout unit 2160 receives electrical signal data produced by the imaging detectors 2102 and converts this data into digital signals for subsequent processing. The readout unit 2160 may be similar to and/or the same as the readout unit 132 in FIG. 5. Additionally or alternatively, digital signals are generated by the imaging detectors 2102. An image reconstruction device 2162 and a memory 2164 may be provided in addition to the controller circuit 2136. The controller circuit 2136 is configured to control the operation of the medical imaging system 2100. The controller circuit 2136 may be similar to and/or the same as the controller circuit 136 in FIG. 5. The controller circuit 2136 may include one or more processors. Optionally, the controller circuit 2136 may include a central processing unit (CPU), one or more microprocessors, or any other electronic component capable of processing input data according to specific logical instructions. Optionally, the controller circuit 2136 may include and/or represent one or more hardware circuits or circuitry that include, are connected with, or that both include and are connected with one or more processors, controllers, and/or other hardware logic-based devices. Additionally or alternatively, the controller circuit 2136 may execute instructions stored on a tangible and non-transitory computer readable medium (e.g., the memory 2164). Additionally or alternatively, the readout unit 2160 and the image reconstruction device 2162 may be integrated with and/or a part of the controller circuit 2136. Additionally, a user input device 2166 may be provided to receive user inputs (e.g., control commands), as well as a display 2168 for displaying images.

It may be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "controller circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "controller circuit".

The computer, subsystem, controller circuit, circuit, or module execute a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, subsystem, controller circuit, and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A method comprising:
measuring a collected energy signal from a first pixel of a radiation pixelated detector during at least one event;
measuring adjacent energy signals from at least two pixels adjacent to the first pixel of the radiation pixelated detector during the at least one event;
generating a first spectrum based on the collected energy signal of the at least one event within a first energy window, wherein the first energy window is bounded by first upper and first lower energy levels defining a predetermined energy range for medical imaging;
determining a delta charge based on the collected energy signal and the adjacent energy signals generated during the at least one event;
generating a second spectrum based on the delta charge of the at least one event outside the first energy window, wherein the second spectrum is within a second energy window bounded by second upper and second lower energy levels defining a range of lower energy levels than the first energy window of the first spectrum; and
shifting the second spectrum to equivalent energy levels of the first energy window of the first spectrum to combine the second spectrum with the first spectrum to form a corrected energy spectrum.

2. The method of claim 1, further comprising determining a ratio based on a peak of the first spectrum and the delta charge, wherein shifting the second spectrum comprises multiplying the second spectrum by the ratio.

3. The method of claim 2, wherein the delta charge represents a difference in the collected energy signal and the adjacent energy signals.

4. The method of claim 1, further comprising determining if the event corresponds to a charge sharing event, and based on the determination of the charge sharing event adjusting the collected energy signal based on a portion of the adjacent energy signals representing a charge sharing pixelated anode.

5. The method of claim 1, further comprising adjusting the adjacent energy signals based on an adjusting factor, wherein the second spectrum is generated by subtracting the adjusted adjacent energy signals from the collected energy signal.

6. The method of claim 5, further comprising calculating the adjusting factor based on a morphology of the collected energy signal and the adjacent energy signal with respect to each other.

7. The method of claim 1, wherein a spectrum of the collected energy signal outside the energy window represents a first energy tail, the corrected energy spectrum having a second energy tail that is smaller than the first energy tail.

8. The method of claim 1, wherein the corrected energy spectrum is configured to have a peak that is aligned with a peak of the first spectrum.

9. A system comprising:
a radiation pixelated detector having a plurality of pixelated anodes operably coupled to corresponding electronic channels;
a controller circuit operably coupled to the electronic channels, the controller circuit is configured to:
measure a collected energy signal from a first pixel of the radiation pixelated detector during at least one event;
measure adjacent energy signals from at least two pixels adjacent to the first pixel of the radiation pixelated detector during the at least one event;
generate a first spectrum based on a portion of the collected energy signal of the at least one event within a first energy window, wherein the first energy window is bounded by first upper and first lower energy levels defining a predetermined energy range for medical imaging;
determine a delta charge based on the collected energy signal and the adjacent energy signals generated during the at least one event;
generate a second spectrum based on the delta charge of the at least one event outside the first energy window, wherein the second spectrum is within a second energy window bounded by second upper and second lower energy levels defining a range of lower energy levels than the first energy window of the first spectrum; and
shifting the second spectrum to equivalent energy levels of the first energy window of the first spectrum to combine the second spectrum with the first spectrum to form a corrected energy spectrum based on the delta charge.

10. The system of claim 9, wherein the controller circuit is configured to determine a ratio based on a peak of the first spectrum and the delta charge, and to shift the second spectrum by multiplying the second spectrum by the ratio.

11. The system of claim 10, wherein the delta charge represents a difference of the collected energy signal and the adjacent energy signals.

12. The system of claim 9, wherein the controller circuit is configured to determine if the event corresponds to a charge sharing event, and based on the determination of the charge sharing event adjusting the collected energy signal based on a portion of the adjacent energy signals representing a charge sharing pixelated anode.

13. The system of claim 9, wherein the controller circuit is configured to adjust the collected energy signal and the adjacent energy signals based on an adjusting factor, wherein the second spectrum is generated by subtracting the adjusted adjacent energy signals from the collected energy signal.

14. The system of claim 13, wherein the controller circuit is configured to calculate the adjusting factor based on a morphology of the collected energy signal and the adjacent energy signal with respect to each other.

15. The system of claim 9, wherein a spectrum of the collected energy signal outside the energy window represents a first energy tail, the corrected energy spectrum having a second energy tail that is smaller than the first energy tail.

16. The system of claim 9, wherein the corrected energy spectrum is configured to have a peak that is aligned with a peak of the first spectrum.

17. A method comprising:
measuring a collected energy signal from a first pixel of a radiation pixelated detector during at least one event;
measuring adjacent energy signals from at least two pixels adjacent to the first pixel of the radiation pixelated detector during at least one event;
determining a corrected energy signal based on the collected energy signal and the adjacent energy signals based on an adjusting factor;
determining a delta charge based on the collected energy signal and the adjacent energy signals;

generating a spectrum based on the delta charge of the at least one event, wherein the spectrum is within an energy window bounded by upper and lower energy levels defining a range of energy levels; and shifting the spectrum to form a corrected energy spectrum based on the delta charge.

18. The method of claim 17, further comprising calculating the adjusting factor based on a morphology of the collected energy signal and the adjacent energy signals with respect to each other.

19. The method of claim 17, wherein the corrected energy spectrum is configured to have a peak that is aligned with a peak of a spectrum of the collected energy signal.

20. The method of claim 17, further comprising determining if the event corresponds to a charge sharing event from the first pixel and the second pixel, and based on the determination of the charge sharing event adjusting the corrected energy signal based on a portion of the adjacent energy signals within the energy window.

* * * * *